(12) United States Patent
Baker et al.

(10) Patent No.: US 11,668,646 B2
(45) Date of Patent: *Jun. 6, 2023

(54) INFRA-RED SPECTROSCOPY SYSTEM

(71) Applicant: DXCOVER LIMITED, Glasgow (GB)

(72) Inventors: Matthew J. Baker, Glasgow (GB); Mark Hegarty, Glasgow (GB); Holly Jean Butler, Glasgow (GB); David Palmer, Glasgow (GB)

(73) Assignee: DXCOVER LIMITED, Glasgow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,080

(22) Filed: Dec. 1, 2021

(65) Prior Publication Data

US 2022/0091023 A1    Mar. 24, 2022

Related U.S. Application Data

(63) Continuation of application No. 16/496,053, filed as application No. PCT/GB2018/050821 on Mar. 28, 2018, now Pat. No. 11,215,553.

(30) Foreign Application Priority Data

Mar. 31, 2017 (GB) .................................... 1705221
Sep. 12, 2017 (GB) .................................... 1714643

(51) Int. Cl.
*G01N 21/25* (2006.01)
*G01N 21/01* (2006.01)
(Continued)

(52) U.S. Cl.
CPC ........... *G01N 21/253* (2013.01); *G01N 21/01* (2013.01); *G01N 21/35* (2013.01); *G01N 21/552* (2013.01); *G01N 2021/3595* (2013.01)

(58) Field of Classification Search
CPC ...... G01N 21/253; G01N 21/01; G01N 21/35; G01N 21/552; G01N 2021/3595
See application file for complete search history.

(56) References Cited

U.S. PATENT DOCUMENTS

| 5,578,499 A | 11/1996 | Ismail ........................... 436/524 |
| 5,976,885 A | 11/1999 | Cohenford et al. ............ 436/63 |

(Continued)

FOREIGN PATENT DOCUMENTS

| EP | 1143251 A1 | 10/2001 |
| JP | H10300667 A | 11/1998 |

(Continued)

OTHER PUBLICATIONS

Hands, J. R. et al. (2016) "Brain tumour differentiation: rapid stratified serum diagnostics via attenuated total reflection Fourier-transform infrared spectroscopy," *Journal of Neuro-Oncology* 127(3), 463-472.

(Continued)

*Primary Examiner* — Michael P LaPage
(74) *Attorney, Agent, or Firm* — Medlen & Carroll, LLP

(57) ABSTRACT

A sample slide (100) for use in a spectrometer (501), wherein the sample slide comprises a plurality of sample-receiving portions (111-114) provided on a sample side (115) of the slide, and a plurality of beam-receiving portions (121-124) provided on a beam-receiving side (125) of the slide, each beam-receiving portion being arranged opposite a respective sample-receiving portion, and wherein each beam-receiving portion is configured to act as an internal reflection element (IRE). A device (300) for use with a spectrometer (501) comprises a stage (330) configured to receive a sample slide (100); and a moving mechanism (360) configured to move the sample slide relative to a sample-measuring location (320) of the device. Associated methods (Continued)

for preparing a sample and measuring a sample are also disclosed.

17 Claims, 28 Drawing Sheets

(51) Int. Cl.
  *G01N 21/35* (2014.01)
  *G01N 21/552* (2014.01)

(56) References Cited

U.S. PATENT DOCUMENTS

| | | | |
|---|---|---|---|
| 5,977,545 A | 11/1999 | Haar et al. | 250/339.12 |
| 6,496,636 B1 | 12/2002 | Braiman et al. | 385/129 |
| 6,707,040 B2 | 3/2004 | Makarov et al. | 250/288 |
| 6,710,870 B1 | 3/2004 | Marowsky et al. | 356/317 |
| 7,200,311 B1 | 4/2007 | Han | 385/129 |
| 7,255,835 B2 | 8/2007 | Franzen et al. | 436/171 |
| 8,792,102 B2 | 7/2014 | Patil et al. | 356/456 |
| 2003/0054181 A1* | 3/2003 | Swerdlow | G01N 21/6452 |
| | | | 427/378 |
| 2003/0175160 A1 | 9/2003 | Archibald et al. | 435/6 |
| 2004/0190826 A1 | 9/2004 | Ghiron et al. | 385/36 |
| 2005/0110989 A1 | 5/2005 | Schermer et al. | 356/246 |
| 2005/0113475 A1 | 5/2005 | Nishida et al. | 526/72 |
| 2005/0211555 A1 | 9/2005 | Archibald | 436/173 |
| 2005/0214167 A1 | 9/2005 | Archibald et al. | 422/82.05 |
| 2007/0211985 A1 | 9/2007 | Duer | 435/288.7 |
| 2011/0157693 A1 | 6/2011 | Dultz et al. | 356/445 |
| 2015/0330974 A1 | 11/2015 | Staker et al. | 702/19 |
| 2016/0139047 A1 | 5/2016 | Geiger et al. | 250/339.11 |
| 2016/0334612 A1 | 11/2016 | Stoecker et al. | 422/551 |
| 2017/0015843 A1 | 1/2017 | Liu et al. | 428/142 |
| 2017/0022107 A1 | 1/2017 | Siebert et al. | 423/555 |
| 2018/0196028 A1 | 7/2018 | Kapelushnik et al. | 250/338.1 |
| 2020/0063200 A1* | 2/2020 | Staker | G16B 30/00 |

FOREIGN PATENT DOCUMENTS

| | | |
|---|---|---|
| JP | 2001-311685 A | 11/2001 |
| JP | 2003513251 A | 4/2003 |
| JP | 3107464 U | 2/2005 |
| JP | 2006507504 A | 3/2006 |
| WO | WO/2000/042433 | 7/2000 |
| WO | WO/2001/031566 | 5/2001 |
| WO | WO/2014/076480 | 5/2014 |
| WO | WO/2017/045998 | 3/2017 |

OTHER PUBLICATIONS

Hands, J. R. et al. (2014) "Attenuated Total Reflection Fourier Transform Infrared (ATR-FTIR) spectral discrimination of brain tumour severity from serum samples," *Journal of Biophotonics* 7(3-4), 189-199.

Karabudak, E. et al. (2013) "Disposable Attenuated Total Reflection-Infrared Crystals from Silicon Wafer: A Versatile Approach to Surface Infrared Spectroscopy," *Analytical Chemistry* 85(1), 33-38.

Pike Technologies. (2018) XY Autosampler—Transmission and Reflection, Automated Sampling in Microplate Format.

Schumacher, H. et al. (2010) "Applications of microstructured silicon wafers as internal reflection elements in attenuated total reflection Fourier transform infrared spectroscopy," *Applied Spectroscopy* 64(9), 1022-1027.

THORLABS. (2019) Microscopy Slide and Test Target Holders.

PCT International Search Report of International Application No. PCT/GB2018/050821 dated Sep. 21, 2018.

* cited by examiner

| Temp (°C) | Time (min) | Fan Speed (V) | | | |
|---|---|---|---|---|---|
| | | 0 | 5 | 12 | 14 |
| 25 | 0 | 28.73 | 30.65 | 27.91 | 29.27 |
| | 2 | 28.29 | 29.22 | 16.36 | 18.51 |
| | 4 | 22.79 | 19.71 | 15.98 | 15.81 |
| | 6 | 19.84 | 15.16 | 15.93 | 15.68 |
| 30 | 0 | 28.71 | 26.79 | 21.88 | 22.55 |
| | 2 | 16.94 | 13.95 | 13.00 | 12.86 |
| | 4 | 12.88 | 12.50 | 12.61 | 12.44 |
| | 6 | 12.43 | 12.28 | 12.65 | 12.37 |
| 35 | 0 | 27.86 | 21.70 | 19.71 | 18.11 |
| | 2 | 14.11 | 11.86 | 11.87 | 11.88 |
| | 4 | 12.33 | 11.16 | 11.81 | 11.81 |
| | 6 | 11.14 | 10.87 | 11.99 | 11.89 |

| Temp (°C) | Time (min) | Fan Speed (V) | | | |
|---|---|---|---|---|---|
| | | 0 | 5 | 12 | 14 |
| 25 | 0 | 0.026237 | 0.022954 | 0.030528 | 0.027429 |
| | 2 | 0.029249 | 0.028071 | 0.046992 | 0.044733 |
| | 4 | 0.037265 | 0.044012 | 0.047041 | 0.046978 |
| | 6 | 0.041573 | 0.047461 | 0.047042 | 0.046929 |
| 30 | 0 | 0.027959 | 0.034242 | 0.040803 | 0.041402 |
| | 2 | 0.044405 | 0.045685 | 0.047207 | 0.047541 |
| | 4 | 0.047473 | 0.046007 | 0.046891 | 0.047356 |
| | 6 | 0.047346 | 0.045884 | 0.046663 | 0.04718 |
| 35 | 0 | 0.032465 | 0.040658 | 0.044567 | 0.045723 |
| | 2 | 0.046232 | 0.04754 | 0.048068 | 0.048353 |
| | 4 | 0.045906 | 0.047411 | 0.047762 | 0.048129 |
| | 6 | 0.04627 | 0.047095 | 0.046522 | 0.048033 |

Figure 23

|         |            | Fan Speed (V) |      |      |      |
| Temp (°C) | Time (min) | 0    | 5    | 12   | 14   |
| --- | --- | --- | --- | --- | --- |
| 25 | 0 | 5.15 | 0.13 | 2.37 | 1.10 |
|    | 2 | 3.49 | 0.93 | 1.44 | 4.37 |
|    | 4 | 7.33 | 3.48 | 0.95 | 0.66 |
|    | 6 | 6.46 | 0.50 | 0.86 | 0.69 |
| 30 | 0 | 4.74 | 2.87 | 4.55 | 1.25 |
|    | 2 | 5.46 | 3.04 | 0.73 | 0.94 |
|    | 4 | 1.32 | 0.86 | 0.69 | 1.04 |
|    | 6 | 0.91 | 0.81 | 0.76 | 1.11 |
| 35 | 0 | 1.93 | 4.56 | 2.08 | 2.16 |
|    | 2 | 3.67 | 0.53 | 1.15 | 0.70 |
|    | 4 | 1.38 | 0.60 | 1.14 | 0.68 |
|    | 6 | 0.53 | 0.72 | 1.11 | 0.71 |

Figure 24

| Temp (°C) | Time (min) | Fan Speed (V) | | | |
|---|---|---|---|---|---|
| | | 0 | 5 | 12 | 14 |
| 25 | 0 | 0.007502 | 0.001094 | 0.005763 | 0.003153 |
| | 2 | 0.006628 | 0.003167 | 0.002628 | 0.005256 |
| | 4 | 0.010637 | 0.00325 | 0.002414 | 0.001223 |
| | 6 | 0.007975 | 0.002533 | 0.002436 | 0.001288 |
| 30 | 0 | 0.006892 | 0.004892 | 0.004561 | 0.001886 |
| | 2 | 0.006046 | 0.002664 | 0.002249 | 0.002177 |
| | 4 | 0.001581 | 0.002934 | 0.002393 | 0.002042 |
| | 6 | 0.001921 | 0.002901 | 0.002514 | 0.001976 |
| 35 | 0 | 0.004291 | 0.003039 | 0.001771 | 0.002449 |
| | 2 | 0.002859 | 0.001838 | 0.001449 | 0.001374 |
| | 4 | 0.002561 | 0.003092 | 0.001333 | 0.001332 |
| | 6 | 0.003079 | 0.002134 | 0.001284 | 0.001337 |

Figure 25

INFRA-RED SPECTROSCOPY SYSTEM

CROSS-REFERENCE TO RELATED APPLICATIONS

This application is a Continuation of, and claims priority to, U.S. patent application Ser. No. 16/496,053, filed Sep. 20, 2019, now U.S. Pat. No. 11,215,553, issued on Jan. 4, 2022, which is a 371 U.S. National Entry of patent application PCT/GB2018/050821, filed Mar. 28, 2018, now expired, claiming priority to United Kingdom patent application 1714643.2, filed Sep. 12, 2017, now expired, and United Kingdom patent application 1705221.8, filed Mar. 31, 2017, now expired, the contents of which are incorporated herein in their entirety.

The present invention relates to apparatuses and methods for performing Infrared spectroscopy analysis, and in particular, though not exclusively, for performing ATR-FTIR spectroscopy analysis.

BACKGROUND OF THE INVENTION

Fourier Transform Infrared (FTIR) spectroscopy is a technique commonly used in chemical sciences in order to identify discrete vibrations of chemical bonds. This technique uses light in the mid-infrared (MIR) region (4000-400 $cm^{-1}$) that is, in the same frequency range as the frequency range of chemical bond vibrations.

Biological molecules are known to actively vibrate in this range of wavelengths, and thus FTIR spectroscopy lends itself to biological applications. When a biological sample is irradiated with MIR light, some of this energy is absorbed by the sample. The absorption profile of a given sample is representative of the chemical bonds present within a sample, and can be used to characterise complex biological materials.

An example of a particular type of analysis using FTIR spectroscopy is in the investigation of proliferative disorders, such as cancer, which are caused by uncontrolled and unregulated cellular proliferation and can, in some cases, lead to the formation of a tumour.

There are three principal sampling modes used in FTIR spectroscopy: transmission, transflection, and attenuated total reflection (ATR).

In the "transmission" mode, MIR light is passed, or transmitted, directly through a given sample that has been deposited on an IR transparent substrate (such as $CaF_2$ or $BaF_2$). As this mode is reliant upon the IR beam passing through the sample, there are constraints to maximum sample thickness and water content.

In the "transflection" mode, a sample is deposited on an IR reflective slide (such as low-E or metal coated). MIR light is passed through the sample and it is then reflected back towards the detector. As the beam is effectively passed through the sample twice, the sample thickness has a direct effect on pathlength and therefore signal strength. This also allows further absorption of water, if at all present in the sample. There are some known concerns in the field regarding this form of sampling due to undetermined interaction of light with the reflective surface of the substrates.

"Attenuated Total Reflection" (ATR) employs an internal reflective element (IRE) through which the IR beam is passed. The sample is deposited directly onto the IRE, and maintained in close contact with it. These IREs can be made from a number of different materials, including diamond, germanium, zinc selenide or silicon. Each material differs slightly in its refractive properties. When IR light is passed through an IRE above a defined angle, described as the critical angle, the light is internally reflected through this medium. When the beam meets the IRE and sample interface, this results in the production of an evanescent wave which penetrates into the sample. The depth of this penetration is dependent upon the wavelength of light, the refractive indices of the IRE and the sample, as well as the angle of incidence: however, is generally in the region between 0.5-2 µm. The beam is then reflected by the IRE towards a detector.

One benefit of ATR-FTIR is the reduced influence of water absorbance on the IR spectrum, allowing the interrogation of water-containing samples. This is particularly important to biological samples which will intrinsically contain water. Although water molecules still absorb in this sampling mode, the penetration depth of the evanescent wave is much smaller than the pathlength of transmission and transflection FTIR spectroscopy. Therefore, much less water is being sampled, allowing the underlying sample absorbance to still be monitored.

This technique has therefore lent itself well to the analysis of biological samples, particularly biofluids. These are known to be information rich and have been shown to be suitable for the detection of disease in a patient population. It has been shown that this technique is capable of diagnosing brain tumours at a range of severities using blood serum from a cohort of 433 patients (Hands et al., 2016; Hands et al. 2014).

Recently a method of diagnosing brain cancer by performing Attenuated Total Reflection—Fourier Transform Infrared (ATR-FTIR) spectroscopic analysis of blood samples has been described in WO 2014/076480). In contrast to conventional ATR-IR (where a sample is placed on a substrate that is then brought into contact with the ATR crystal), the ATR crystal was used as the substrate for the sample. This method provides a point of care and non-destructive diagnostic test. However, it requires careful preparation of the blood samples prior to carrying out a spectroscopic analysis, and thorough cleaning and drying of the ATR crystal before the ATR crystal can be reused for analysis of another sample, which is both time-consuming and expensive.

Thus, despite the suitability of ATR-FTIR for analysis of biological samples, a significant instrumentation limitation is that an ATR-FTIR spectrometer, or an ATR attachment for an FTIR spectrometer, is typically composed of a single IRE. As the sample is placed directly onto this IRE, this limits this technique to a single sample approach where the sample needs to be prepared, analysed, removed from the IRE, followed by a thorough clean of the IRE, before the next sample can be analysed using the instrument. In the case of biofluids like blood serum, this process is significantly elongated as there is a requirement to dry the sample, to unearth subtle biomolecular information. The time this takes is volume dependent, but has been determined as 8 minutes for 1 µL blood serum spot. As a consequence, this approach cannot be considered high-throughput. Reasons for this restriction include the high cost of current IREs, combined with engineering requirements for specific attachments.

U.S. Pat. No. 7,255,835 (Franzen et al) discloses an apparatus and method for acquiring an infrared spectrum of a solubilised sample, in a FTIR microscope.

SUMMARY OF THE INVENTION

According to a first aspect of the present invention, there is provided a sample slide for use in a spectrometer, wherein the sample slide comprises:

a plurality of sample-receiving portions provided on a sample side of the slide, and a plurality of beam-receiving portions provided on a beam-receiving side of the slide, each beam-receiving portion being arranged opposite a respective sample-receiving portion, and wherein each beam-receiving portion is configured to act as an internal reflection element (IRE).

The provision of a sample slide having multiple sample-receiving portions allows the possibility of performing multiple measurements from a single slide without having to remove and replace the sample slide between successive measurements, particularly when used in combination with a device as described in respect of the second aspect of the invention. This may avoid the need to remove, clean and dry a IRE between successive measurements as is current practice, thus permitting high throughput ATR-FTIR analysis.

The sample-receiving portions may be aligned, e.g. may be longitudinally aligned relative to the slide. The sample-receiving portions may define or may be arranged as a row of sample-receiving portions. In another embodiment, the sample-receiving portions may be provided as or may define a plurality of rows of sample-receiving portions. Each row may comprise a number of aligned sample-receiving portions.

The sample slide may comprise a number of sample-receiving portions arranged in a row. For example, the slide may comprise four sample-receiving portions arranged in a row. This may allow for one sample-receiving portion to be used for background measurement, and three sample-receiving portions to be used for triplicate measurements from a patient. It will be appreciated that any number of sample-receiving portions may be envisaged, depending on the number of measurements wishing to be made from a single slide.

The sample slide may comprise a number of sample-receiving portions arranged in a plurality of rows, e.g. in a grid pattern. For example, the slide may comprise 24 sample-receiving portions arranged in 4 rows of 6 (4×6), e.g. similar to a 24-well plate arrangement. For example, the slide may comprise 96 sample-receiving portions arranged in 8 rows of 12 (8×12), e.g. similar to a 96-well plate arrangement. This may allow for one sample-receiving portion in each row to be used for background measurement, and for multiple sample-receiving portions to be used for multiple measurements from a patient, for each row. It will be appreciated that any number of sample-receiving portions may be envisaged for such grid-like or wellplate-like arrangement, depending on the number of measurements wishing to be made from a single slide.

Alternatively, a plurality of slides having a number of sample-receiving portions arranged in a row may be combined, e.g. may be placed adjacent to each other, e.g. laterally and/or longitudinally. This arrangement may allow the formation of a grid pattern having a plurality of sample-receiving portions arranged in a plurality of rows, using multiple "single-row" slides.

One or more sample-receiving portions may define or may consist of a recessed portion, e.g. relative to a surface of the slide, e.g. relative to an outer surface on a sample side of the slide. Alternatively, or additionally, one or more sample-receiving portions may be surrounded by a raised portion, e.g. relative to a surface of the slide, e.g. relative to an outer surface on a sample side of the slide. By such provision, risk of cross-contamination between adjacent sample-receiving portions may be reduced or avoided.

Typically, one or more sample-receiving portions, e.g. the sample-receiving portions, may be configured to receive or support a dry sample, in use. In an embodiment, one or more sample-receiving portions, e.g. the sample-receiving portions, may be configured to receive a liquid sample such as a biofluid, e.g. blood or serum, and may be dried so as to support a dry sample for use in a spectrometer.

Conveniently, the sample slide may comprise a/the internal reflective element(s) IRE(s). The sample slide may be configured to act as a/the IRE(s).

The beam side of the slide may comprise a plurality of beam-receiving portions. Typically, each beam-receiving portion may be provided on the beam side opposite a respective sample-receiving portion on the sample side.

Each beam-receiving portion may be configured to act as an IRE.

The beam-receiving portions may be configured to permit a radiation beam to penetrate a surface of the beam-receiving portions on the beam side of the slide. Advantageously, the beam-receiving portions may be configured to permit a radiation beam to penetrate a surface of a beam-receiving portion on the beam side of the slide at angle such that the radiation beam may be reflected on an internal surface of a respective sample-receiving portion, and may be permitted to exit the slide through the surface of the beam-receiving portion on the beam side.

The/each beam-receiving portion may comprise or may define a plurality of grooves and/or prisms, preferably a plurality of elongate grooves and/or prisms, e.g., a plurality of aligned, parallel and/or adjacent grooves and/or prisms.

Each groove may have or may define a first groove face and a second groove face. The/each first groove face may be arranged to allow a radiation beam to penetrate, e.g. inwards, a surface thereof. The/each second groove face may be arranged to allow a radiation beam to penetrate, e.g. outwards, a surface thereof.

Each prism may have or may define a first prism face and a second prism face. The/each first prism face may be arranged to allow a radiation beam to penetrate, e.g. inwards, a surface thereof. The/each second prism face may be arranged to allow a radiation beam to penetrate, e.g. outwards, a surface thereof.

Typically, the first groove face of a groove may correspond to the first prism face of an adjacent prism. The second groove face of a groove may correspond to the second prism face of an adjacent prism.

In an embodiment, the prisms may protrude outwardly, e.g. relative to a surface, e.g. a flat surface, of the slide on the beam side thereof. In another embodiment, the prisms may be recessed, e.g. relative to a surface, e.g. a flat surface, of the slide on the beam side thereof. Alternatively, an outer portion of the prisms may protrude outwardly, e.g. relative to a surface, e.g. a flat surface, of the slide on the beam side thereof, and an inner portion of the prisms may be recessed, e.g. relative to a surface, e.g. a flat surface, of the slide on the beam side thereof.

The slide may have a thickness, e.g. between a sample side and a beam side, in the range of 100-1000 µm, e.g. in the range of 200-800 µm, e.g. in the range of 300-700 µm. In some embodiments, the slide may have a thickness, e.g. between a sample side and a beam side, of approximately 380 µm, 525 µm or 675 µm.

The/each groove or prism may have a width, e.g. a maximum width, in the range of 50-500 µm, e.g. in the range of 50-300 µm, e.g. in the range of 100-250 µm. In some embodiments, the/each groove or prism may have a width, e.g. a maximum width, of approximately 100 µm, 150 µm, 200 µm or 250 µm.

The/each groove or prism may have a depth, e.g. a maximum depth, in the range of 50-500 µm, e.g. in the range of 50-300 µm, e.g. in the range of 70-200 µm. In some embodiments, the/each groove or prism may have a depth, e.g. a maximum depth, of approximately 70 µm, 100 µm, 140 µm or 175 µm.

Adjacent grooves may have a spacing in the range of 0-200 µm, e.g. in the range of 10-150 µm, e.g. in the range of 25-100 µm. In some embodiments, adjacent grooves may have a spacing of approximately 25, 50 or 100 µm. When a spacing between adjacent grooves is present, an outermost region of a respective prism comprise a levelled and/or flat portion, e.g. at a tip or outermost region thereof.

A surface, e.g. a first face and/or a second face or the/each groove or prism, may extend at an angle, e.g. relative to a surface of the slide, e.g. on a beam side thereof, in the region of 30-75°, e.g. 35-55°. It will be appreciated that the exact angle chosen for a given slide may depend on the material selected for manufacture of the slide, and/or on the expected angle of incidence of the irradiation beam. For example, the angle a groove face and/or prism face may depend on the specific material used and/or on the crystalline structure thereof. When the slide is made of a <100> silicon material, a first face and/or a second face or the/each groove or prism, may extend at an angle, e.g. relative to a surface of the slide, e.g. on a beam side thereof, in the region of 40-75°, e.g. 45-65°, e.g. approximately 55°, e.g. 54.74°. When the slide is made of a <110> silicon material, a first face and/or a second face or the/each groove or prism, may extend at an angle, e.g. relative to a surface of the slide, e.g. on a beam side thereof, in the region of 30-50°, e.g. 30-40°, e.g. approximately 35°, e.g. 35.3°.

The sample slide may be made of a material suitable for use as an IRE, for example germanium, diamond, zinc selenide, or silicon. Advantageously, the sample slide may be made of silicon. The use of silicon may considerably reduce the costs associated with the manufacture of the slide, and may allow the slide to be used as a disposable slide, thus avoiding the need for cleaning and drying the slide before and/or after use.

The sample slide may comprise, may be provided on or within, or may be attached to, a slide holder.

The slide holder may be configured to receive and/or hold the sample slide.

The use of a slide holder to hold the sample slide may help prevent or reduce contact between a user and the sample slide, thus reducing contamination associated with handling the slide. This is particularly advantageous when the sample slide comprises or acts as the internal reflective element(s). The use of a slide holder may also provide the sample slide with additional structural integrity, thus reducing the risk of damage or mechanical failure of the slide.

Typically, the slide holder may be made from a polymer material, e.g. ABS (acrylonitrile-butadiene-styrene), polycarbonate, polypropylene, or the like. Alternatively, the slide holder may be made from a metallic material, e.g. aluminium.

Advantageously, the slide holder may have a size corresponding to the standard dimensions of a microscope slide. Typically, the size of the holder may be approximately 75×25×1 mm. This may help use of the sample slide into conventional laboratories by conforming to existing handling procedures and avoiding the need to change common procedures.

The slide holder may be provided with a tag region suitable for receiving an identifier, e.g. a unique identifier associated with the slide received in the holder and/or with the samples. The sample identifier may comprise or may be a barcode, a QR code, or the like, and may contain information associated with the samples and/or a subject.

The sample holder may be provided with well markers which may provide a user with information regarding one or more sample-receiving regions or wells, such as one or more markers for a respective background well or respective background wells, and one or more markers for respective sample wells.

The sample holder may have a sample side and a beam side.

On its sample side, the slide holder may comprise or may define at least one window or opening having a size sufficient to expose one or more sample-receiving portions. In an embodiment, the slide holder may comprise or may define a plurality or windows or openings, each window or opening corresponding to a respective sample-receiving portion of the slide. The windows or openings may be of a similar size to the size of their respective sample-receiving portions. The provision of separate windows may provide a further physical barrier between adjacent sample-receiving portions of the slide, thus further reducing the risk of cross-contamination between adjacent sample-receiving portions. One or more windows or openings, e.g. each window or opening, may have a size of approximately 1-10 mm×1-10 mm. Typically, one or more windows or openings, e.g. each window or opening, may have a size of approximately 5 mm×5 mm.

On its beam side, the slide holder may comprise or may define at least one window or opening having a size sufficient to expose the beam-receiving portions of the slide. In an embodiment, the sample holder may comprise or may define a window or opening on its beam side having a size sufficient to expose the plurality of beam-receiving portions of the slide. In another embodiment, the sample holder may comprise or may define a plurality or windows or openings on its beam side, each window or opening corresponding to a respective beam-receiving portion of the slide. The windows or openings may be of a similar size to the size of their respective beam-receiving portions, such as approximately 1-10 mm×1-10 mm. e.g., 5 mm×5 mm.

According to a second aspect of the present invention, there is provided a device for use with a spectrometer, the device comprising:

a stage configured to receive a sample slide; and a moving mechanism configured to move the sample slide relative to a sample-measuring location of the device.

Advantageously, the sample slide may be configured to receive a plurality of samples. The sample slide may comprise a plurality of sample-receiving portions. The provision of a moving mechanism arranged to move the sample slide relative to the sample-measuring location allows the analysis of multiple samples without having to remove and replace the sample slide between successive measurements. This is advantageous when the sample slide comprises or includes one or more IREs or one or more IRE portions, as this avoids the need to remove, clean and dry the IRE(s) or IRE portions between successive measurements.

The sample slides may comprise a sample side and a beam side.

The sample side may comprise or may define a plurality of sample-receiving portions. In an embodiment, the sample-receiving portions may be aligned, e.g. may be longitudinally aligned relative to the slide. The sample-receiving portions may define or may be arranged as a row of sample-receiving portions. In another embodiment, the sample-receiving portions may be provided as or may define a plurality of rows of sample-receiving portions. Each row may comprise a number of aligned sample-receiving portions.

The sample slide may be a sample slide according to the first aspect of the invention, features of which are equally applicable to the device according to a second aspect, and the features described therein are thus not repeated here merely for reasons of brevity.

The stage is configured to receive a sample slide.

The stage may be configured to receive and/or secure the sample slide.

When the sample slide is provided on or within, or is attached to, a slide holder, the stage may be configured to receive and/or secure the slide holder.

The moving mechanism may be configured to move the stage. The sample slide and/or slide holder may be stationary relative to the stage. In such instance, moving the sample slide relative to the sample-measuring location may be caused by moving the stage.

The moving mechanism may be configured to move the sample slide. The sample slide may be movable relative to the stage. In such instance, moving the sample slide relative to the sample-measuring location may be caused by moving the sample slide itself.

The moving mechanism may be configured to provide unidirectional movement. This may be particularly advantageous when using a sample slide having a number of sample-receiving portions arranged in a row.

The moving mechanism may be configured to provide bidirectional movement, for example along two perpendicular axes, e.g. in a plane substantially parallel to a surface of the slide receiving the sample(s). This may be particularly advantageous when using a sample slide having a number of sample-receiving portions arranged in a plurality of rows, e.g. in a grid pattern.

The moving mechanism may be configured to provide or allow movement in a direction transverse, e.g. substantially perpendicular, to the slide, e.g. substantially perpendicular to an upper surface thereof. This may be advantageous as it may allow adjustment of the position of the sample relative to the beam without requiring adjustment of the optical element(s).

For example, the moving mechanism may be configured to provide or allow movement along a longitudinal axis of the slide and/or in a direction generally aligned with a/the row of sample-receiving portions, and in a direction transverse, e.g. perpendicular, to the slide, e.g. substantially perpendicular to an upper surface thereof.

Alternatively, the moving mechanism may be configured to provide or allow multidirectional movement, for example along three perpendicular axes, such as along two perpendicular axes in a plane parallel to a surface of the slide receiving the sample(s) and along a third axis substantially perpendicular to that plane.

There may be provided at least one motor. The moving mechanism may comprise the motor(s). The moving mechanism, e.g. motor(s), may be actuatable and/or controlled by an actuator. The actuator may be controlled manually and/or automatically.

In use, the moving mechanism, e.g. the motor, may cause the sample slide, slide holder and/or stage to move by a distance corresponding to the distance between two adjacent sample-receiving portions, e.g. by a distance between a central region of two adjacent sample-receiving portions. By such provision, in use, the moving mechanism may allow a sample slide to move sequentially, in order to align its sample receiving-portions and/or beam-receiving portions with a/the radiation beam at/in the sample-measuring location. This may allow automated and/or high throughput measurements of multiple samples using a conventional ATR-FTIR spectrometer.

The device may further comprise at least one optical element configured to guide a radiation beam generated by a/the spectrometer to the sample-measuring location of the device.

The at least one optical element may be provided within an optical compartment. The optical compartment may comprise one or more optical elements, typically a plurality of optical elements.

One or more of the optical elements may comprise or may be one or more mirrors.

The optical elements may be arranged to guide, e.g. reflect, a radiation beam generated by the spectrometer to a/the sample-measuring location.

The optical elements may be arranged to guide, e.g. reflect, a radiation beam reflected by the sample slide, e.g. by an IRE thereof, to a detector of the spectrometer.

The device, e.g. optical compartment thereof, may have an inlet to allow the radiation beam generated by the spectrometer to enter the optical compartment. The device, e.g. optical compartment thereof, may have an outlet to allow the radiation beam reflected by the sample slide, e.g. by an IRE thereof, to exit the optical compartment.

The device may be configured such that, when the device is installed or fitted on a/the spectrometer, the sample measuring location of the device is located at or substantially at a location where a sample would be placed using a conventional reflectance accessory or ATR accessory during use of the spectrometer. For example, the device is configured such that the sample-measuring location is arranged to receive the radiation beam of the spectrometer. Thus, the device may be considered to be an accessory for use with a conventional spectrometer.

The device, e.g. optical compartment, may be configured such that the inlet and outlet are aligned with the normal direction of the radiation beam, i.e. with the direction of the radiation beam when the device is not present. Thus, the device may be considered to be an accessory for use with a conventional spectrometer.

In an embodiment, the optical compartment may have a plurality of mirrors, e.g. three mirrors, configured to guide the radiation beam to the IRE at a predefined angle of incidence, and return the modified beam back towards the detector. The mirrors may be flat, curved, or a combination thereof. In an embodiment, the optical compartment may comprise 3 mirrors, e.g. flat mirrors that reflect the radiation beam from the inlet to the sample-measuring location, and 3 mirrors, e.g. flat mirrors, e.g. three different flat mirrors, that return the radiation beam to the outlet. In another embodiment, the optical compartment may comprise one or more curved mirrors, or a combination of flat mirrors and curved mirrors, and may also optionally comprise one or more lenses or focussing elements. A person of ordinary skill in the art will appreciate that the optical elements, e.g. mirrors, may be arranged to guide or deliver the radiation beam to the sample-measuring location at a desired angle, which may depend on the configuration and material of the slide and IRE portion(s) thereof.

One or more of the optical elements may be adjustable. By such provision, the angle of incidence of the radiation beam on the slide may be adjusted. This may allow the use of slides having different configurations and/or of slides made from different materials.

The features described in respect of any other aspect of the invention are equally applicable to the device according to the second aspect, and are therefore not repeated here for brevity.

According to a third aspect of the present invention, there is provided a device for use with a spectrometer, the device comprising:

at least one optical element configured to guide a radiation beam generated by the spectrometer to a sample-measuring location of the device;

a stage configured to receive a sample slide; and a moving mechanism configured to move the sample slide relative to the sample-measuring location.

The device, e.g. optical compartment, may be configured such that the inlet and outlet are aligned with the normal direction of the radiation beam, i.e. with the direction of the radiation beam when the device is not present. Thus, the device may be considered to be an accessory for use with a conventional spectrometer.

The features described in respect of any other aspect of the invention are equally applicable to the device according to the third aspect, and are therefore not repeated here merely for reasons of brevity.

According to a fourth aspect of the present invention, there is provided a method for measuring a sample, the method comprising:

coupling a device to a spectrometer, placing a sample slide having a plurality of sample-receiving portions on a stage of the device;

moving the sample slide relative to the sample-measuring location so as to sequentially analyse, measure or detect a plurality of samples disposed on the slide.

The term "coupling" will be herein understood to mean that the device may be used with a spectrometer. Typically, in use, the device may be physically connected to the spectrometer, for example may be placed/laid onto a portion of the spectrometer, may be inserted within an internal portion of the spectrometer, and/or may optionally be secured or attached to the spectrometer, for example to reduce risks of disconnection and/or movement during analysis.

The term "analyse" will be herein understood to include measurement, detection, processing, or the like. Thus, the term "analyse" will be herein understood as referring to the measurement or detection of a sample by FTIR spectrometry, and may also optionally include, but not necessarily, further processing of the measured information, for example using multivariate analysis, processing algorithms, machine learning, and/or Principal Component Analysis (PCA). For example, the use of PCA allows variables between datasets to be compared, visualised and/or highlighted, thus identifying possible variations, e.g. biological variations, between samples.

The device may have an optical compartment comprising an inlet and an outlet, wherein the inlet is arranged to allow a radiation beam generated by the spectrometer to enter the optical compartment, and the outlet is arranged to allow the radiation beam reflected by a sample slide to exit the optical compartment.

The method may comprise guiding the radiation beam generated by the spectrometer from the inlet to the sample-measuring location of the device.

The method may comprise guiding the radiation beam reflected by the sample slide from the sample-measuring location to the outlet of the device.

The spectrometer may be an IR spectrometer, e.g. a FTIR spectrometer, typically an ATR-FTIR spectrometer, e.g. an FTIR spectrometer equipped with or coupled to an ATR element.

The method may use Fourier transform IR (FTIR) spectroscopic analysis. In FTIR, the IR spectra may be collected in the region of 400-4000 wavenumbers ($cm^{-1}$). Generally the IR spectra may have a resolution of 10 $cm^{-1}$ or less, typically approximately 8 $cm^{-1}$ or 4 $cm^{-1}$. The FTIR spectroscopic analysis may employ at least 10 scans, at least 15, or at least 30 scans. The FTIR spectroscopic analysis may employ at most 100 scans, at most 50 scans, or at most 40 scans. For example, 32 scans may be used. The scans may be co-added. As will be appreciated by the skilled person, the number of scans may be selected to optimize data content and data-acquisition time.

The method may use Attenuated Total Reflection (ATR)-IR spectroscopic analysis. In some embodiments, the spectroscopic analysis may be ATR-FTIR.

The method may comprise placing one or more samples on the sample slide. The method may comprise placing a sample on one or more sample-receiving portions of the slide. At least one sample, e.g. the samples, may comprise a biological sample, e.g. a biofluid such as blood or blood serum. Typically, when providing the sample(s) on the slide, the sample(s) may be in liquid form. At least one sample, e.g. the samples, may comprise a non-biological sample.

The method may comprise drying one or more samples, e.g. the samples. Typically, the method may comprise drying one or more samples on the sample slide. Conveniently, the method may comprise drying one or more samples on the sample slide prior to placing the sample slide on the stage of the device. This may improve the handleability of the slide.

The method may comprise drying the sample(s) under optimised conditions. It has been discovered that, surprisingly, the drying conditions may affect the spectra obtained during subsequent analysis. In particular, it has been discovered that certain drying conditions may lead to improved reproducibility of analysis and/or sharpness and/or intensity in the spectra.

The method may comprise drying the sample(s) and/or sample slide at a temperature of approximately 30-36° C., e.g., about 33-36° C., e.g. about 34.5-35.5° C., e.g. about 35° C.

The method may comprise drying the sample(s) and/or sample slide under gas flow, e.g. air flow, e.g. under controlled gas flow conditions. The flow rate may be in the range of about 5-200 $m^3$/h, e.g. about 10-125 $m^3$/h, e.g., about 15-115 $m^3$/h. The flow rate may be at least 10 $m^3$/h, e.g. at least 15 $m^3$/h, e.g. at least 50 $m^3$/h, e.g. at least 90 $m^3$/h.

The method may comprise flowing a gas, e.g. air, over the sample(s), for example for a predetermined length of time.

The method may comprise drying the sample(s) and/or sample slide such that the drying time of the samples and/or sample slide is approximately 1-5 minutes, e.g. 1-3 minutes, e.g. approximately 2 minutes.

The features described in respect of any other aspect of the invention are equally applicable to the method according to the fourth aspect, and are therefore not repeated here for brevity.

According to a fifth aspect of the present invention, there is provided a method for measuring a sample, the method comprising:

coupling a device to a spectrometer, the device having an optical compartment comprising an inlet and an outlet, wherein the inlet is arranged to allow a radiation beam generated by the spectrometer to enter the optical compartment, and the outlet is arranged to allow the radiation beam reflected by a sample slide to exit the optical compartment, placing a sample slide having a plurality of sample-receiving portions on a stage of the device;

moving the sample slide relative to the sample-measuring location so as to sequentially analyse, measure or detect a plurality of samples disposed on the slide.

Typically, in use and/or during measurement, one or more sample, e.g., each sample, associated with a respective sample-receiving portion, may be dry.

The features described in respect of any other aspect of the invention are equally applicable to the method according to the fifth aspect, and are therefore not repeated here for brevity.

According to a sixth aspect of the present invention, there is provided a method of preparing a sample for IR spectral analysis, the method comprising drying one or more samples on the sample slide under gas flow conditions.

It has been discovered that, surprisingly, the drying conditions may affect the spectra obtained during subsequent analysis. In particular, it has been discovered that certain drying conditions may lead to improved reproducibility of analysis and/or sharpness/intensity in the spectra.

The method may comprise placing one or more samples on the sample slide. The method may comprise placing a sample on one or more sample-receiving portions of the slide. At least one sample, e.g. the samples, may comprise a biological sample, e.g. a biofluid such as blood or blood serum. Typically, when providing the sample(s) on the slide, the sample(s) may be in liquid form.

The method may comprise drying the samples and/or sample slide at a temperature of approximately 30-36° C., e.g., about 33-36° C., e.g. about 34.5-35.5° C., e.g. about 35° C.

The method may comprise drying the samples and/or sample slide under controlled gas flow conditions. The flow rate may be in the range of about 5-200 m$^3$/h, e.g. about 10-125 m$^3$/h, e.g., about 15-115 m$^3$/h. The flow rate may be at least 10 m$^3$/h, e.g. at least 15 m$^3$/h, e.g. at least 50 m$^3$/h, e.g. at least 90 m$^3$/h.

The method may comprise flowing a gas, e.g. air, over the sample(s), for example for a predetermined length of time.

The method may comprise drying the samples and/or sample slide such that the drying time of the samples and/or sample slide is approximately 1-5 minutes, e.g. 1-3 minutes, e.g. approximately 2 minutes.

The features described in respect of any other aspect of the invention are equally applicable to the method according to the sixth aspect, and are therefore not repeated here for brevity.

BRIEF DESCRIPTION OF THE DRAWINGS

Various aspects of the invention will now be described by way of example only, and with reference to the accompanying drawings, in which:

FIG. 23 is a Table showing the mean intensity corresponding to the peak of absorbance for the amide I group for different temperatures;

FIG. 24 is a Table showing the standard deviation for measurements corresponding to the peak of absorbance for the hydroxyl group for different temperatures;

FIG. 25 is a Table showing the standard deviation for measurements corresponding to peak of absorbance for the amide I group for different temperatures;

DETAILED DESCRIPTION

Figure 1:
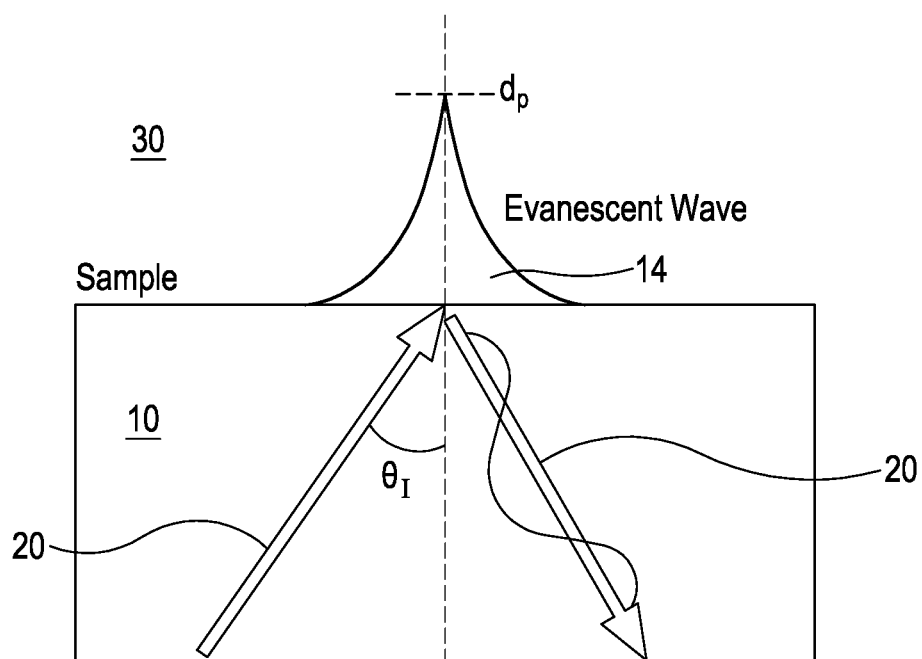
FIG. 1 is a schematic representation of the principles of ATR-IR spectroscopy.
Figure 2:
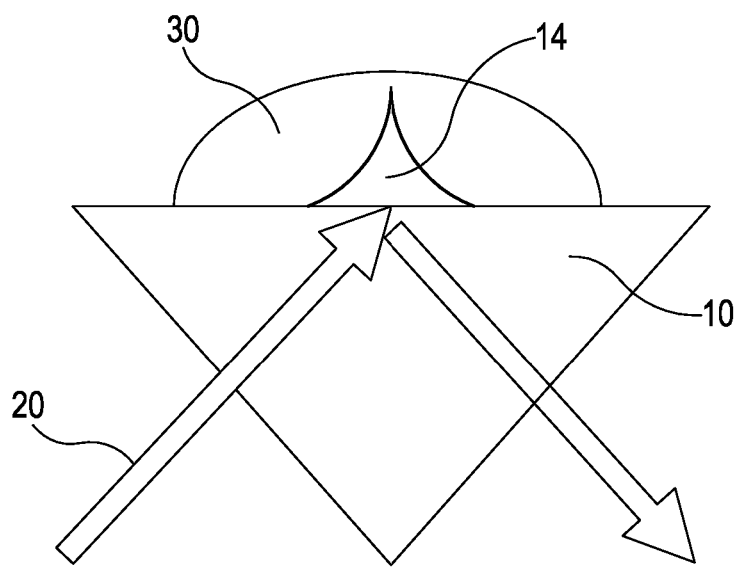
FIG. 2 is a schematic representation of a conventional set-up showing a single IRE for performing ATR-IR spectroscopy analysis.

Referring to FIG. 1 there is shown a schematic representation of the principles of ATR-IR spectroscopy. In FIG. 2, these principles are illustrated in the context of the conventional set-up showing a single IRE for performing ATR-IR spectroscopy analysis.

As shown in FIGS. 1 and 2, "Attenuated Total Reflection" (ATR) employs an internal reflective element (IRE) 10 through which an IR beam 20 is passed. The sample 30 is deposited directly onto the IRE 10. The specific refractive properties of the IRE depends on the material from which the IRE is made, which can be for example diamond, germanium, zinc selenide or silicon. As shown in FIG. 1, when the IR light beam 20 is passed through the IRE 10 at an angle $\theta_1$ above the critical angle, the beam 20 is internally reflected through this medium on its upper surface 12 in contact with the sample 30. When the beam 20 meets the IRE and sample interface 12, this results in the production of an evanescent wave 14 which penetrates into the sample 30. The depth of this penetration is dependent upon the refractive indices of the IRE 10 and the sample 30, and is generally in the range of 0.5-2 µm. The beam 20, which then contains information about the sample 30, is then reflected by the IRE 10 towards a detector.

FIGS. 3 to 6 illustrate various views of an embodiment of a sample slide, generally denoted 100, according to an embodiment of the present invention.

Figure 3:
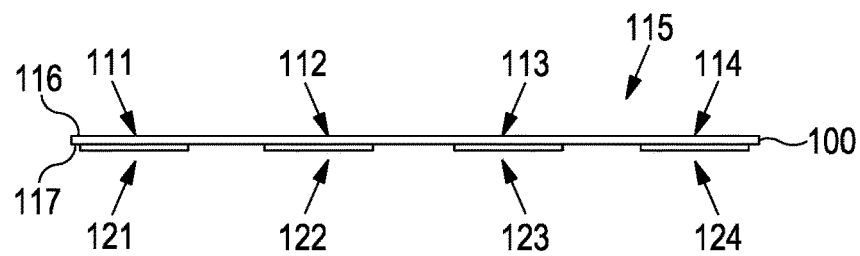
FIG. 3 is a side view of a sample slide according to an embodiment of the present invention.
Figure 5:
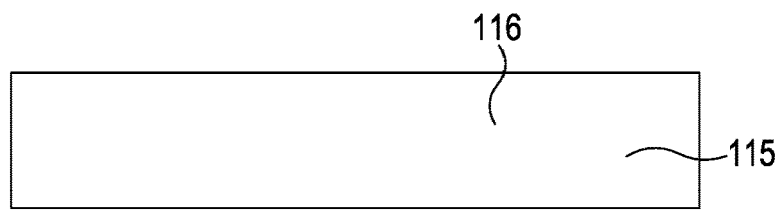
FIG. 5 is a view from above of the sample slide of FIG. 3.

As best shown in FIGS. 3 and 5, in this embodiment, the slide 100 has four sample-receiving portions 111, 112, 113, 114 provided on a sample side 115 of the slide 100 and arranged in a row. The provision of a sample slide 100 having multiple sample-receiving portions 111-114 allows the possibility of performing multiple measurements from a single slide 100 without having to remove and replace the sample slide 100 between successive measurements. This may avoid the need to remove, clean and dry an IRE between successive measurements as is current practice, thus permitting high throughput ATR-FTIR analysis.

In this embodiment, the surface 116 of the slide 100 on its sample side 115 is substantially flat. However, in other embodiments, one or more of the sample-receiving portions 111-114 may define or may consist of a recessed portion, e.g. relative to an upper surface 116 of the slide 100. Alternatively, or additionally, one or more of the sample-receiving portions 111-114 may be surrounded by a raised portion, e.g. relative to an upper surface 116 of the slide 100.

Figure 6:
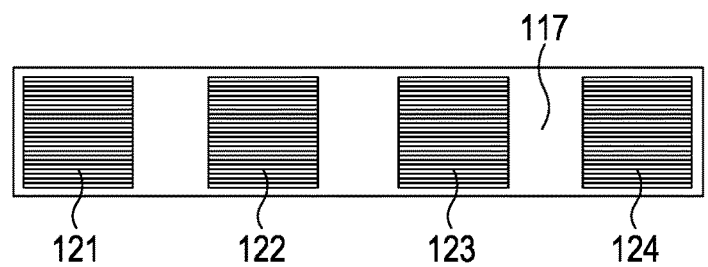
FIG. 6 is a view from below of the sample slide of FIG. 3.

As best shown in FIG. 6, the sample slide 100 also has four beam-receiving portions 121,122,123,124 provided on a beam side 125 of the slide 100. Each beam-receiving portion 121-124 is arranged opposite a respective sample-receiving portion 111-114. Advantageously, each beam-receiving portion 121-124 is configured to act as an internal reflection element (IRE). For example, in this embodiment, one sample-receiving portion 121 may be used for background measurement, and three sample-receiving portions 122,123,124 to be used for triplicate measurements of a subject's sample, or for measurements of three separate samples from one or more subjects.

Advantageously, the slide 100 contains and acts as the internal reflective elements (IRE(s)) required to perform ATR-FTIR analysis.

Figure 4:
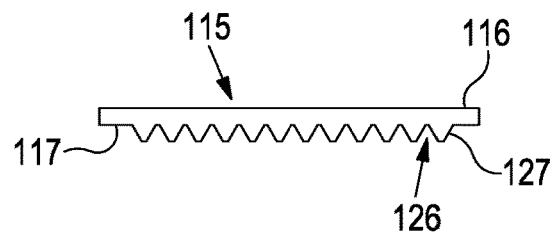
FIG. 4 is a left hand side view of the sample slide of FIG. 3.

As best shown in FIGS. 4 and 6, the beam-receiving portions 121-124 are configured to permit a radiation beam to penetrate a surface of the beam-receiving portions 121-124 on the beam side 125 of the slide 100.

Each beam-receiving portion 121-124 defines has a plurality of elongate grooves 126 and prisms 127. Conveniently, each beam-receiving portion 121-124 defines has a plurality of aligned, parallel and adjacent grooves 126 and prisms 127.

Figure 9:
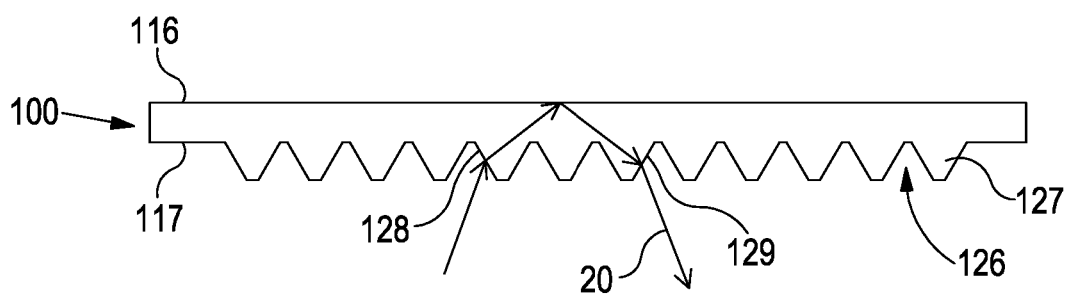
FIG. 9 is a cross-sectional view of the sample slide of FIG. 3, showing a radiation beam reflected by the IRE.
Figure 10:
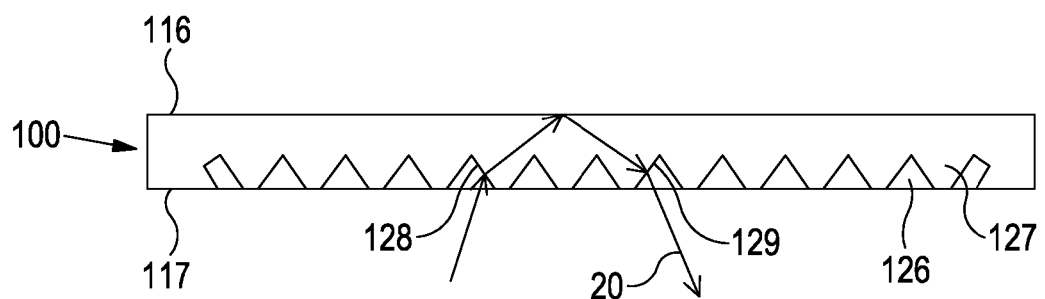
FIG. 10 is a cross-sectional view of the sample slide of FIG. 8, showing a radiation beam reflected by the IRE.

As best shown in FIGS. 4, 9 and 10, each groove 126 has a first groove face 128 and a second groove face 129. Each prism 127 also has a first prism face 128, corresponding to the first groove face, and a second prism face 129, corresponding to the second groove face 129.

Each first groove face 128 or first prism face 128 is arranged to allow a radiation beam 20 to penetrate inwards a surface of a respective prism 127. Each second groove face 129 or second prism face 129 is arranged to allow a radiation beam 20 to penetrate outwards a surface of a respective prism 127.

Figure 7:
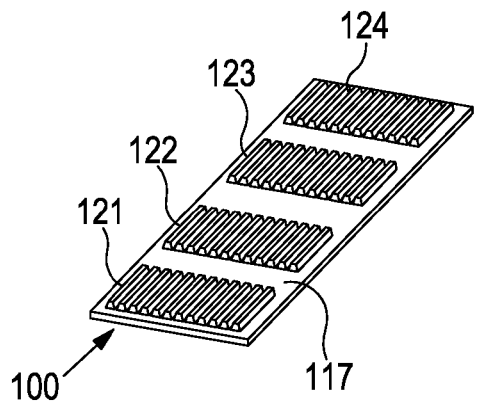
FIG. 7 is an elevated perspective view of the sample slide of FIG. 3.

In the embodiment of FIGS. 7 and 9, the prisms 127 protrude outwardly relative to a lower surface 117 of the slide 100 on the beam side 125 thereof.

Figure 8:
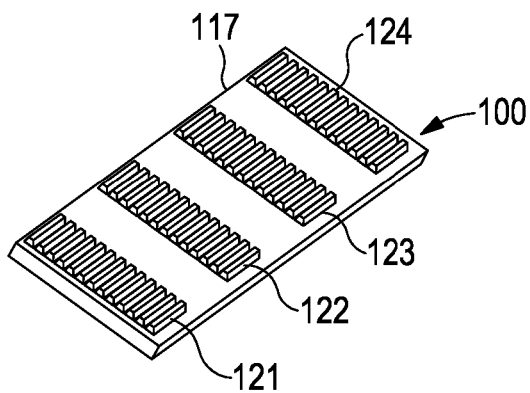
FIG. 8 is an elevated perspective view of an alternative embodiment of a sample slide according to the present invention.

In the embodiment of FIGS. 8 and 10, the prisms 127 are recessed relative to a lower surface 117 of the slide 100 on the beam side 125 thereof.

Alternative embodiments may be envisaged in which an outer portion of the prisms 127 may protrude outwardly relative to a lower surface 117 of the slide 100 on the beam side 125 thereof, and an inner portion of the prisms 127 may be recessed relative to the lower surface 117.

In the embodiments described herein, the thickness (t) of the slide 100 was manufactured to test a number of configurations and dimensions, and each type of slide was tested in the following thicknesses: 380 µm, 525 µm and 675 µm.

Various dimensions of grooves 126 and prisms 127 were envisaged and experimented with, as illustrated in Table 1 below:

TABLE 1

| width (µm) | depth (µm) | spacing (µm) | Design No. |
|---|---|---|---|
| 100 | 70.6 | 25 | 1 |
|  |  | 50 | 2 |
|  |  | 100 | 3 |
| 150 | 105.9 | 25 | 4 |
|  |  | 50 | 5 |
|  |  | 100 | 6 |
| 200 | 141.2 | 25 | 7 |
|  |  | 50 | 8 |
|  |  | 100 | 9 |
| 250 | 176.5 | 25 | 10 |
|  |  | 50 | 11 |
|  |  | 100 | 12 |

Further investigation regarding the configuration and design of the beam-receiving portions 121-124 acting as an IRE element for slide 100, was carried out, as represented by FIGS. 36-41.

Figure 36:
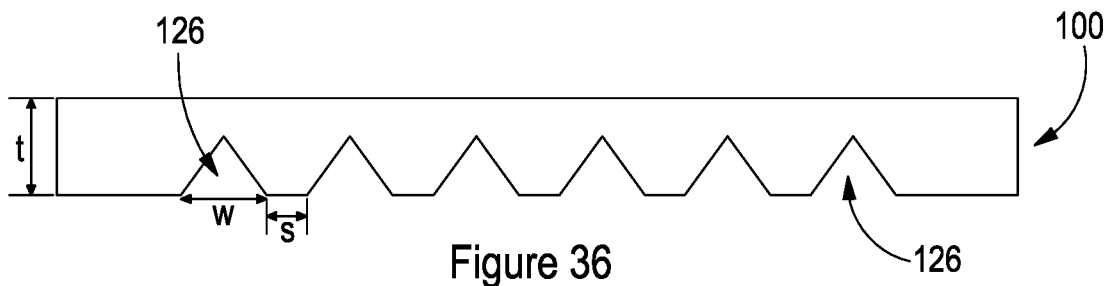
FIG. 36 is a cross-sectional view of an embodiment of a sample slide according to the present invention, showing certain dimension parameters.

As shown in FIG. 36, each beam-receiving portions 121-124 acting as IRE elements has a thickness (t), and grooves 126 have a width (w) and are separated by spacing (s). Testing was performed for width (w) of 100 µm, 150 µm, 200 µm and 250 µm, spacing (s) of 25 µm, 50 µm and 100 µm, and thickness (t) of 380 µm, 525 µm and 675 µm. All slides were made of silicon.

It was expected that a greater groove width (w) may allow more IR light to couple into the IRE elements (beam-receiving portions 121-124) and therefore improve signal throughput and intensity. It was also thought that decreasing the spacing between adjacent grooves (s) may reduce light scattering below the IRE well, reducing noise arising from the stray light recombining at the detector. Lastly, signal quality was expected to improve as the IRE thickness (t) decreased. This is because the effective path length of the IR beam through the IRE (beam-receiving portions 121-124) is reduced, thus preventing specific IR energy bands being absorbed into the material of the IRE itself which would result in a loss of signal at specific wavenumbers.

SNR was calculated by taking the average signal value, $\bar{x}$, of the Amide I band region (1625 $cm^{-1}$ to 1675 $cm^{-1}$) and dividing this by the standard deviation, $\sigma$, found across a region of the spectra where a high amount of noise can be found (1825 $cm^{-1}$ to 1875 $cm^{-1}$). Equation 1 expresses this:

$$SNR = \bar{x}_{signal}/\sigma_{noise} \quad \text{Equation (1)}$$

Figure 37:
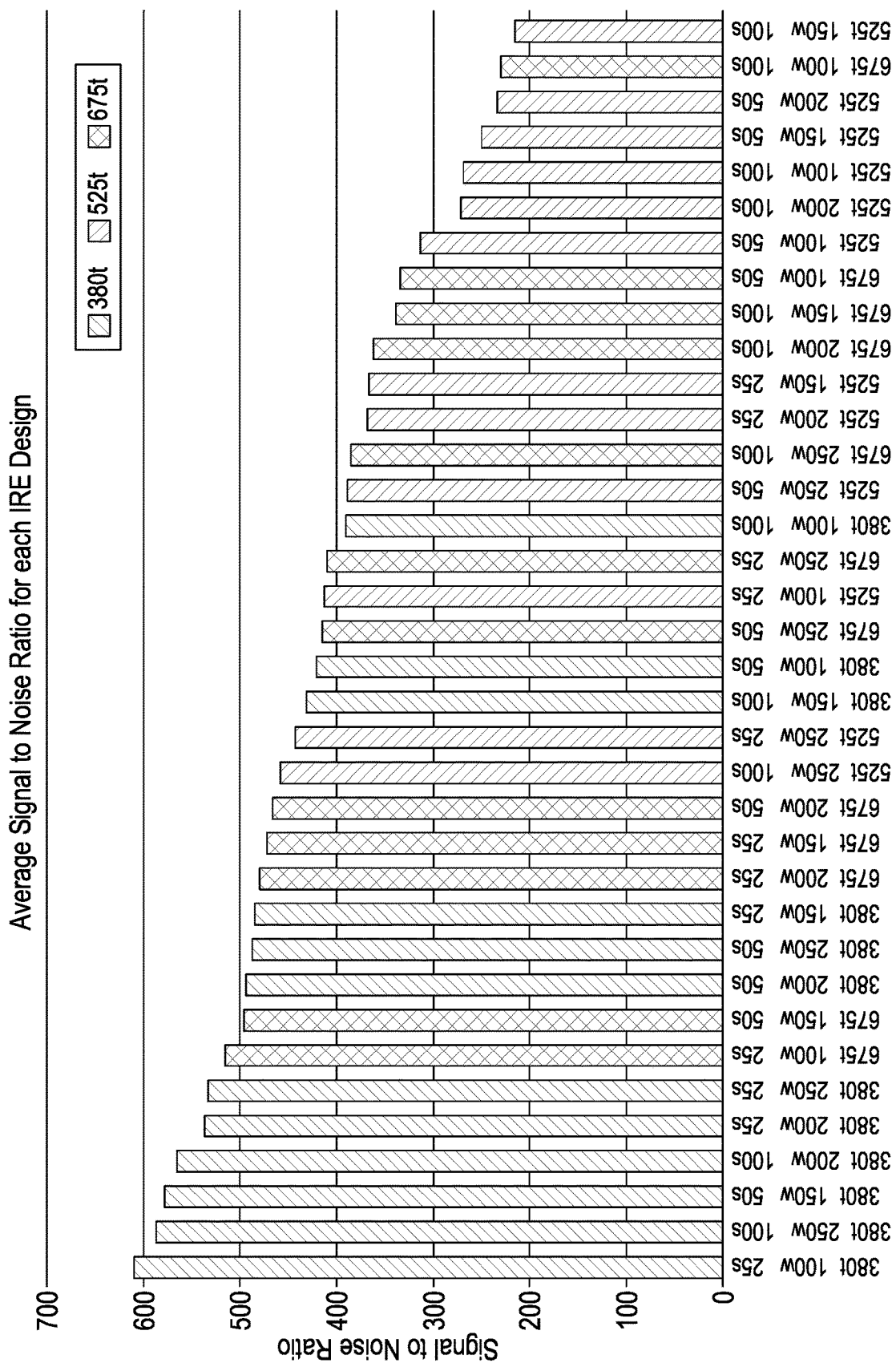
FIG. 37 shows the signal to noise ratio (SNR) of all 36 individual IRE designs investigated for various combinations of width, spacing and thickness.

The results indicating signal-to-noise ratio (SNR) of all 36 individual IRE designs (representing each combination of width, spacing and thickness) are shown in FIG. 37. Colours indicate the 3 thicknesses investigated (red=380 µm, green=525 µm and blue=675 µm).

It was concluded from FIG. 37 that a thickness of 380 µm would generate spectra with a more desirable SNR. This was an unexpected outcome as although the thickness of the IRE is expected to link to a higher information content below 1500 wavenumbers the significant improvement in signal-to-noise ratio demonstrates the superiority of the 380 micron approach.

Figure 38:
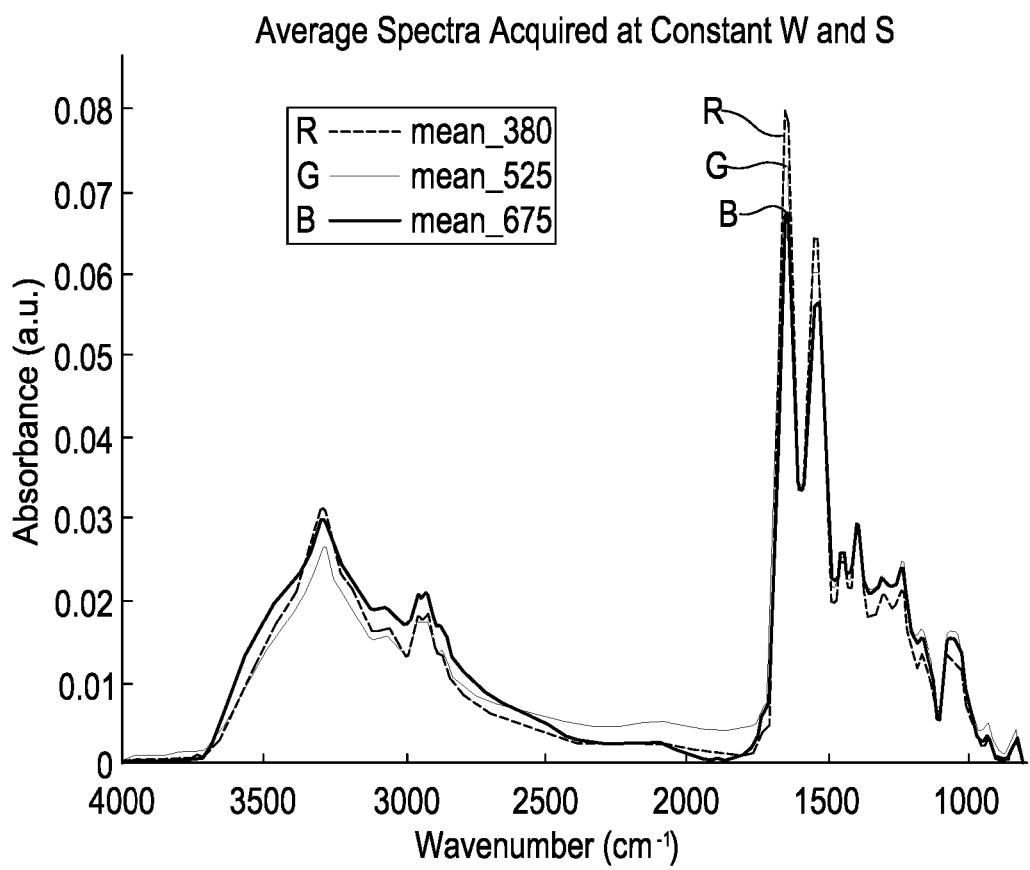
FIG. 38 shows a comparison of spectra obtained from designs of different thicknesses.

A comparison of spectra obtained from designs of different thicknesses is shown in FIG. 38. For this experiment, spacing (s) between grooves, and groove width (w) were kept constant in each case It can be se from FIG. 38 that the peaks of the 380 µm thick IREs are higher, indicating higher spectral intensity. It can also be seen that an improved signal intensity can be observed at the amide 1 and 2 band regions in thinner IREs. The improvement of thinner silicon IREs over thicker elements is further affirmed by way of a one-way ANOVA and Tukey post hoc comparison which confirms a significant difference exists between spectra obtained from 380 µm thick IREs and spectra obtained from 525 µm and 675 µm thick IREs (p<0.001 for a 95% confidence interval). Statistical analysis was carried out using Minitab.

Figure 39:
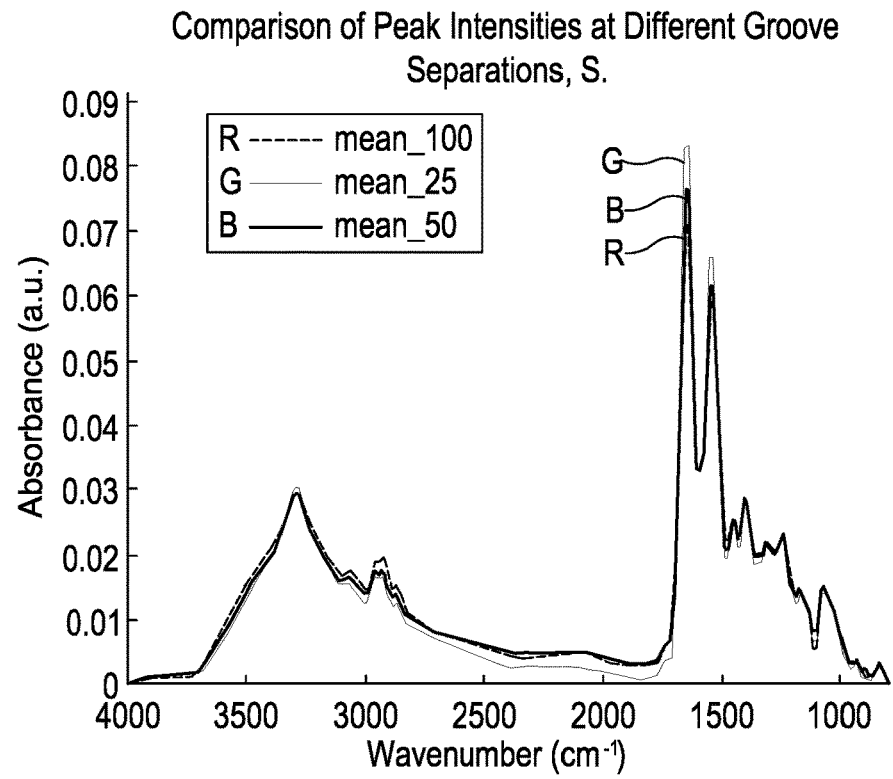
FIG. 39 shows a comparison of peak intensities of IRE designs that have different distances between grooves.

A comparison of peak intensities of IRE designs that have different distances between v-grooves is shown in FIG. 39 (green=25 µm, blue=50 µm and red=100 µm).

This did not suggest a significant impact of groove width (w) and spacing (s) on SNR. There did not appear to be a discernible relationship between SNR and either groove width (w) or spacing (s) between grooves. However, when looking at the intensity of spectra where parameters width and spacing are kept constant, it appeared that a smaller spacing between grooves resulted in greater signal intensity (FIG. 39). This observation was consistent at all t and w values.

Figure 40:
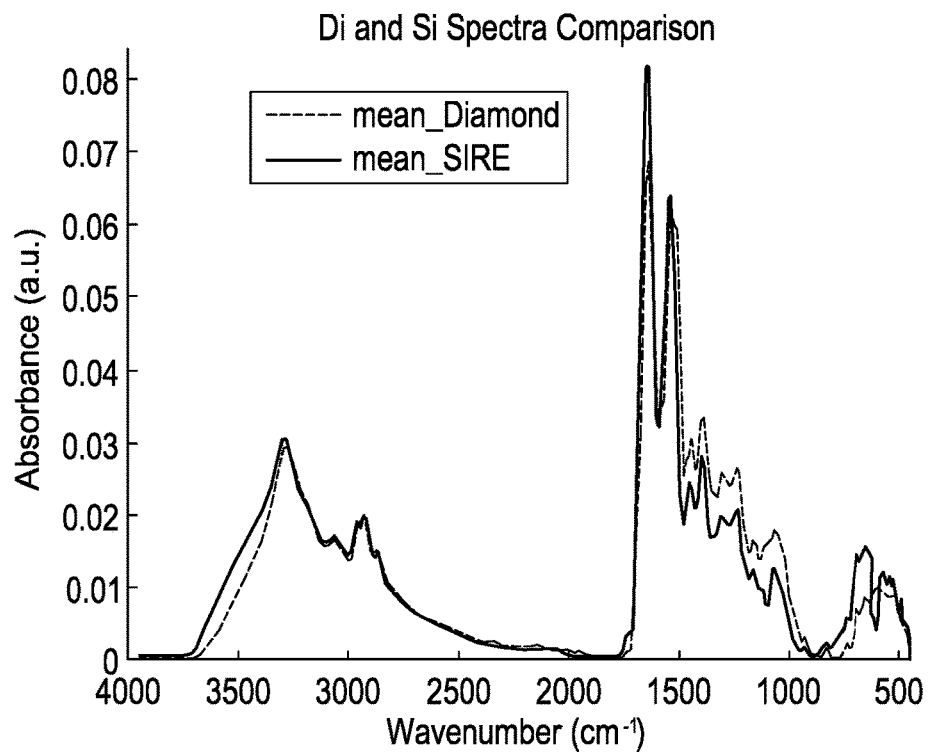
FIG. 40 shows a comparison between the spectra obtained from a multiwell silicon slide according to an embodiment of the present invention, and a conventional diamond IRE.

Silicon naturally absorbs light of certain infrared frequency ranges. More specifically, silicon can cut-off signal below 1500 $cm^{-1}$ wavenumbers as the beam is allowed to travel through the silicon for long enough. The effects of this can be reduced by decreasing the distance the beam travels through the silicon crystal. FIG. 40 shows a comparison between the spectra obtained from a multiwell silicon IRE of the present invention, and a conventional diamond IRE obtained from Specac Ltd.

It can be seen from FIG. 40 that signals below 1500 $cm^{-1}$ can still be acquired using the silicon IREs. However, effects of silicon lattice absorption can still be observed. At about 610 $cm^{-1}$ wavenumbers a trough can be seen in the spectra acquired using Silicon IREs. This is to be expected, and is indicative of signal being lost as a result of internal lattice vibrations.

The use of silicon as the material used to manufacture the slide 100 is particularly advantageous as this considerably reduces the costs associated with the manufacture of the slide 100, and allows the slide 100 to be used and marketed as a disposable slide, thus avoiding the need for cleaning and drying the slide before and/or after use.

Figure 41:
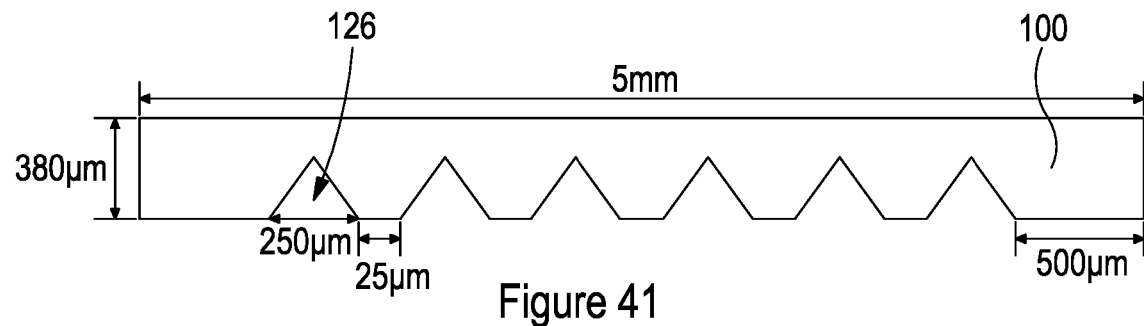
FIG. 41 is a cross-sectional view of a specific embodiment of the sample slide of FIG. 36.

Based on the above observations, an advantageous embodiment of a slide according to the present invention was fabricated, illustrated in FIG. 41, having four 5×5 mm beam-receiving portions 121-124, and having a 380 µm thickness. The grooves were 250 µm wide, with a 25 µm spacing between them.

Additionally, optimum angles for the first face 128 and second face 129 or the grooves 126 and prisms 127 were investigated, as explained in more detail with reference to FIG. 18. A suitable angle for a slide 100 made of silicon was found to be about 54.74° for a <100> silicon slide, and about 35.3° for a <110> silicon slide. It will be appreciated that the exact angle chosen for a give slide may depend on the material selected for manufacture of the slide, and/or on the expected angle of incidence of the irradiation beam.

Referring now to FIGS. 9 and 10 there are shown cross-sectional views of the sample slide 100 of FIGS. 7 and 8, respectively, showing a radiation beam 20 being reflected by the IRE structure of the slide 100. It will be understood that the path of the beam is shown for illustration purposes, and that the actual beam path may depart from the path shown in FIGS. 9 and 10. For example, without wishing to be bound by theory, it is thought that, after the beam 20 has entered the slide 100, for example through a surface of first face 128 of a prism 127, the beam 20 may travel along a direction of the prisms 127, before being reflected on an internal surface 116 of the slide 100 and exiting the slide 100, for example through a second face 129 of another prism 127.

Figure 11:
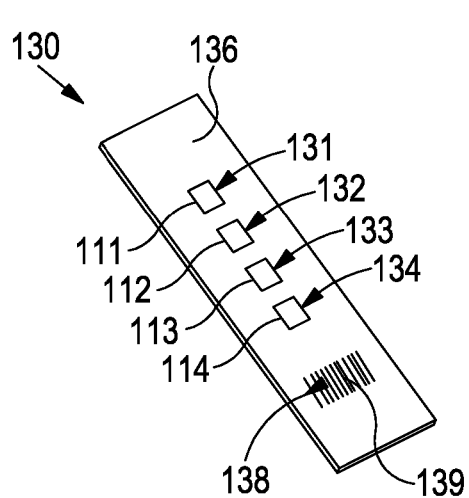
FIG. 11 is an elevated perspective view showing an upper side of a holder holding the sample slide of FIG. 3.
Figure 12:
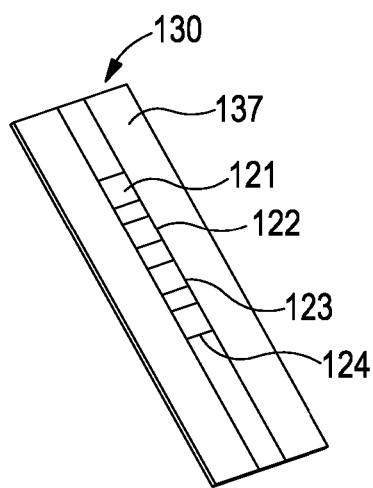
FIG. 12 is an elevated perspective view showing a lower side of a holder holding the sample slide of FIG. 3.

Referring to FIGS. 11 and 12 there are shown an upper side and an underside of a holder 130 configured for holding the sample slide 100 of FIG. 3.

The use of a slide holder 130 to hold the sample slide 100 may help prevent or reduce contact between a user and the sample slide 100, thus reducing contamination associated with handling the slide 100, which is particularly advantageous as the sample slide 100 comprises and acts as the internal reflective element(s). The use of a slide holder 130 also provides the sample slide with additional structural integrity, thus reducing the risk of damage or mechanical failure or the slide 100.

Advantageously, the slide holder 130 has a size corresponding to the standard dimensions of a microscope slide, typically approximately 75×25×1 mm. This may help use of the sample slide 100 into conventional laboratories by conforming to existing handling procedures and avoiding the need to change common procedures.

The sample holder has a sample side 136 and a beam side 137.

On its sample side 136, the slide holder 130 has four windows 131-134, each window corresponding to and being of a similar size to a respective sample-receiving portion 111-114 of the slide 100. Typically, each window 131-134 and sample-receiving portion 111-114 has a size of approximately 5 mm×5 mm, which may allow each sample-receiving portion 111-114 to hold approximately 1-10 µL of sample, in use.

On its beam side 137, the slide holder 130 has a window 135 having a size sufficient to expose the beam-receiving portions 121-124 of the slide 100. In an alternative embodiment, it may be envisaged that the side holder 130 may comprise or may define a plurality or windows on its beam side 137, each window or opening corresponding to a respective beam-receiving portion 121-124 of the slide 100.

The slide holder 130 is provided with a tag region 138 suitable for receiving an identifier 139, which may be associated with the slide 100 received in the holder 130 and with the samples deposited on the slide 100.

Figure 27:
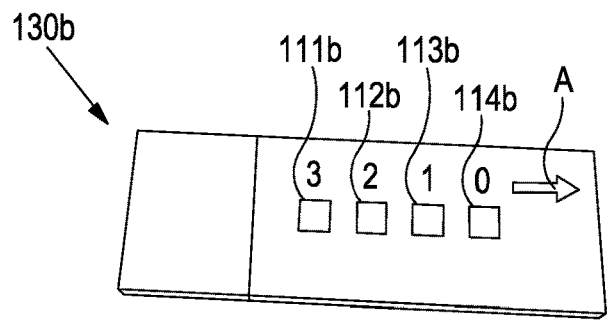
FIG. 27 is an elevated perspective view showing an upper side of a sample slide and holder according to another embodiment of the present invention.

Another embodiment of a holder, denoted 130b, is shown in FIG. 27. The holder 130b of FIG. 27 is generally similar to the holder 130 of FIG. 11, like parts being denoted by like numerals, supplemented by the suffix "b". The holder 130b of FIG. 27 has an arrow A showing the direction of movement of the holder 130b and slide 100b, in use, to align, sequentially, each of the beam-receiving portions (not shown) located opposite their respective sample-receiving portions 111b-114b with a beam of a spectrometer. The holder 130b also has markings 0,1,2,3 to allow easy labelling and referencing of each sample-receiving portion 111b-114b.

Figure 13:
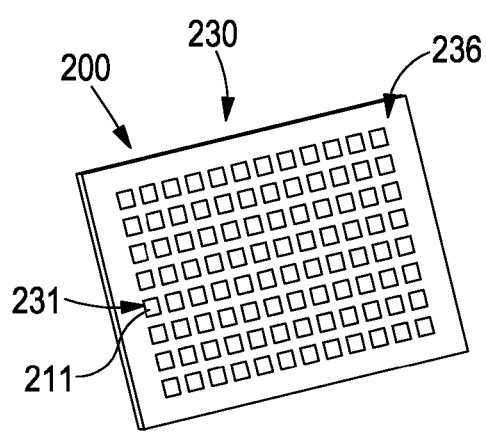
FIG. 13 is an elevated perspective view showing a an upper side of a holder holding a sample slide according to another embodiment the present invention.
Figure 14:
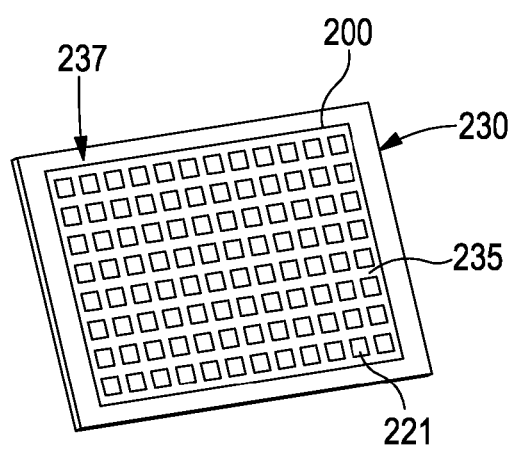
FIG. 14 is an elevated perspective view showing a lower side of the holder of FIG. 13.

Referring now to FIGS. 13 and 14 there are shown an upper side and an underside, respectively, of a holder 230 and corresponding sample slide 200, according to another embodiment the present invention. In this embodiment, the slide 200 has a 96-well plate configuration, that is, has 96 samples receiving portions 211 arranged in 8 rows of 12. Each well-receiving portion 211 has a corresponding beam-receiving portion 221 on a beam side 227 of the slide 200.

On its sample side 236, the slide holder 230 has 96 windows 231, each window corresponding to and being of a similar size to a respective sample-receiving portion 211 of the slide 200.

On its beam side 237, the slide holder 230 has a window 235 having a size sufficient to expose the beam-receiving portions 221 of the slide 200. In an alternative embodiment, it may be envisaged that the slide holder 230 may comprise or may define a plurality or windows on its beam side 237, each window or opening corresponding to a respective beam-receiving portion 221 of the slide 200.

It will be appreciated that any number of sample-receiving portions may be envisaged for such grid-like or well-plate-like arrangement, depending on the number of measurements wishing to be made from a single slide 200.

Figure 15:
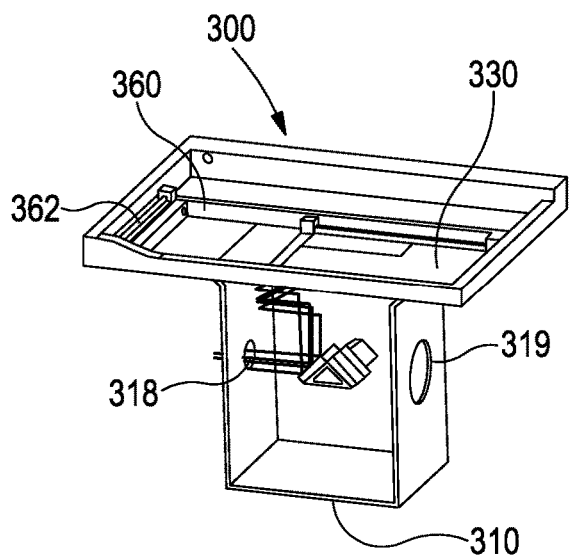
FIG. 15 is an elevated perspective view showing a device for use with a spectrometer, according to an embodiment of the present invention.
Figure 16:
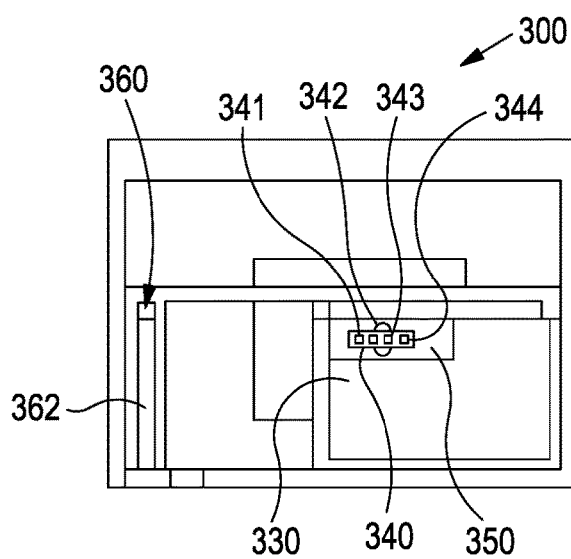
FIG. 16 is a view from above of the device of FIG. 16.

FIGS. 15 and 16 show an elevated perspective view and a top view, respectively, of a device, generally denoted 300, for use with a spectrometer, according to an embodiment of the present invention.

The device 300 comprises an optical compartment 310 which has a plurality of optical elements 311-316 configured to guide a radiation beam 20 generated by the spectrometer to a sample-measuring location 320 (shown in FIG. 17) of the device 300.

The device also has a stage 330 configured to receive a sample slide 340. In this embodiment, the sample slide 340 is a slide 100 as described with reference to FIGS. 3 to 12, and is provided within a holder 350 which is similar to the holder 130 described with reference to FIGS. 11 and 12. Thus, in this embodiment, the stage 330 is configured to receive and secure the slide holder 350 which holds the sample slide 340.

The device 300 contains a moving mechanism 360 which is configured to move the sample slide 340 relative to the sample-measuring location 320. In this embodiment, since the sample slide 340 is provided within a slide holder 350, the moving mechanism 360 is configured to move the slide holder 350 which holds the sample slide 340, relative to the sample-measuring location 320.

Because the slide 340 has four sample-receiving portions 341-344, the provision of a moving mechanism 360 arranged to move the sample slide 340 relative to the sample-measuring location 320 allows the analysis of multiple samples without having to remove and replace the sample slide 340 between successive measurements. This is advantageous when the sample slide comprises or includes one or more IREs, as this avoids the need to remove, clean and dry the IRE(s) between successive measurements.

In this embodiment, the moving mechanism 360 is configured to move the stage 330. Since the sample slide 340 and slide holder 350 are stationary relative to the stage 330, moving the stage 330 causes the sample slide 340 to be moved relative to the sample-measuring location 320.

In this embodiment, because the sample slide 340 has four sample-receiving portions 341-344 aligned in a longitudinal direction, the moving mechanism 360 is configured to provide unidirectional movement in the direction of alignment of the sample-receiving portions 341-344.

However, if using a different slide, for example a slide 200 as described with reference to FIGS. 13 and 14, the moving mechanism 360 may be configured to provide bidirectional movement, for example along two perpendicular axes, in order to allow each of the 96 sample-receiving portions 211 to be sequentially aligned with the sample-measuring location 320.

The moving mechanism 360 comprises a motor 362 for moving the stage 330. The moving mechanism 360, e.g. motor 362, can be controlled by an actuator (not shown), which can be activated manually and/or automatically.

In use, the moving mechanism 360, e.g. motor 362, causes the stage 330, and therefore the sample slide 340, to move by a distance corresponding to the distance between two adjacent sample-receiving portions 341-344. By such provision, in use, the moving mechanism 360 allow the sample slide 340 to move sequentially, in order to align its sample receiving-portions 341-344 and beam-receiving portions with the radiation beam 20 in the sample-measuring location 320. This may allow automated and/or high throughput measurements of multiple samples using a conventional ATR-FTIR spectrometer.

Figure 17:
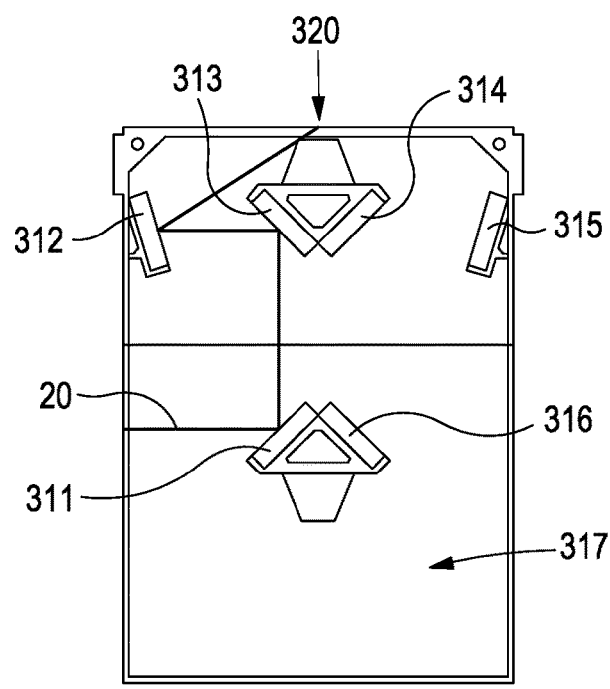
FIG. 17 is a schematic cross-sectional view of an optical compartment of the device of FIG. 15.

An embodiment of the optical compartment 310 of the device 300 is best shown in FIG. 17.

The optical compartment 310 has a plurality of optical elements 311-316 configured to guide a radiation beam 20 generated by the spectrometer to a sample-measuring location 320 of the device 300. In this embodiment, the optical elements 311-316 are mirrors.

The optical compartment 310 has walls that define an optical chamber 317. The optical compartment has an inlet 318 provided in a wall thereof, to allow the radiation beam 20 generated by the spectrometer to enter the optical compartment 310 and the optical camber thereof. The optical compartment has an outlet 319 provided in a wall thereof, e.g. a wall opposite the wall containing the inlet 318, to allow the radiation beam 20 reflected by the sample slide 340, to exit the optical compartment 310. The optical compartment 310 also has an opening (not shown) in an upper wall thereof to allow the reflected beam 20 to hit the sample slide 340 at the sample-measuring location 320.

Typically, the inlet 318 and the outlet 319 are aligned with the normal direction of the radiation beam 20, i.e. aligned with the direction of the radiation beam 20 when the device 300 is not present. Thus, the device 300 may be considered to be accessory for use with a conventional spectrometer.

Optical elements 311-313 are arranged to guide the radiation beam 20 to the sample-measuring location 320 at a predefined angle of incidence, and optical elements 314-316 are arranged to return the modified beam back towards the outlet 319. A person of ordinary skill in the art will appreciate that the optical elements 311-316, e.g. mirrors, may be arranged to guide or deliver the radiation beam 20 to the sample-measuring location 320 at a desired angle, which may depend on the configuration and material of the slide and IRE portion(s) thereof.

Without wishing to be bound by theory, it is thought that an adequate angle of incidence for the radiation beam may be similar to or may be in the region of the angle of the the/a face 128,129 of the slide 100. For example in an embodiment with a <110> silicon slide having a face 128,129 angle of about 35.3°, the angle of incidence may be adjusted to be approximately 32°.

One or more of the optical elements 311-316, e.g. each optical element 311-316, may be adjustable. By such provision, the angle of incidence of the radiation beam on the slide may be adjusted. This may allow the use of slides having different configurations and/or of slides made from different materials.

Figure 28:
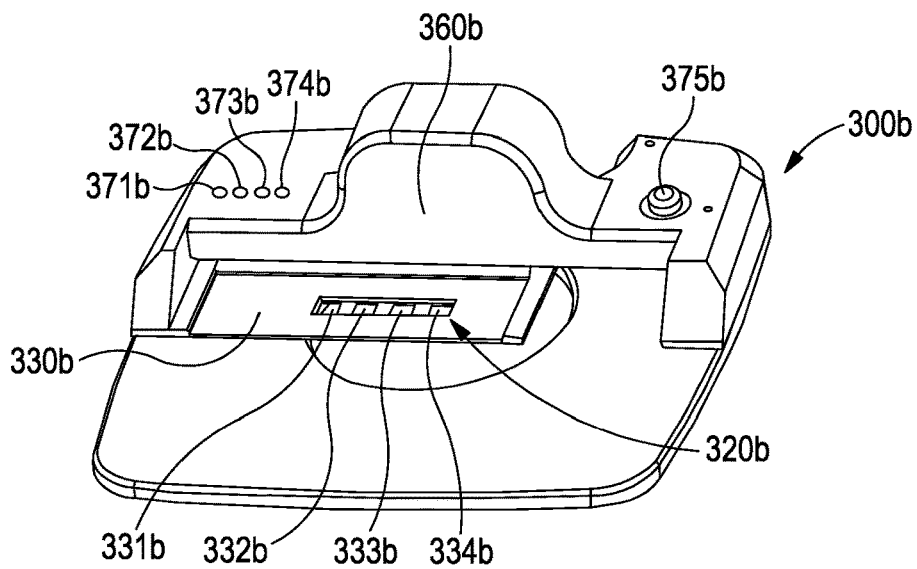
FIG. 28 is an elevated perspective view of a front side of a device for use with a spectrometer, according to another embodiment of the present invention.
Figure 29:
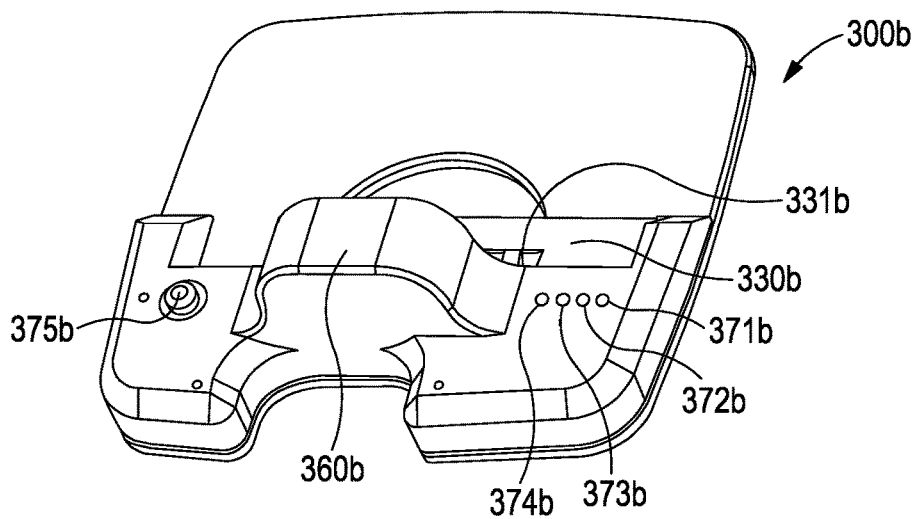
FIG. 29 is an elevated perspective view of a rear side the device of FIG. 28.

FIGS. 28-29 show an elevated perspective view, from front and rear, respectively, of a device, generally denoted 300b, for use with a spectrometer, according to another embodiment of the present invention. The device 300b is generally similar to the device 300 of FIGS. 15-16, like parts being denoted by like numerals, but supplemented by the suffix "b". However, in the embodiment of FIGS. 28-29, the device 300b does not have an optical compartment.

The device 300b has a stage 330b configured to receive a sample slide 340b. The device 300b also has a moving mechanism 360b which is configured to move the sample slide 340b relative to a sample-measuring location 320b. In this embodiment, since the sample slide 340b is provided within a slide holder 350b, the moving mechanism 360b is configured to move the slide holder 350b which holds the sample slide 340b, relative to the sample-measuring location 320b. The device 300b has a switch 375b, and control buttons 371b-374b to control movement of the stage 330b and/or align a desired sample receiving-portions 341b-344b and beam-receiving portions with a radiation beam (not shown) at the sample-measuring location 320b.

Figure 32:
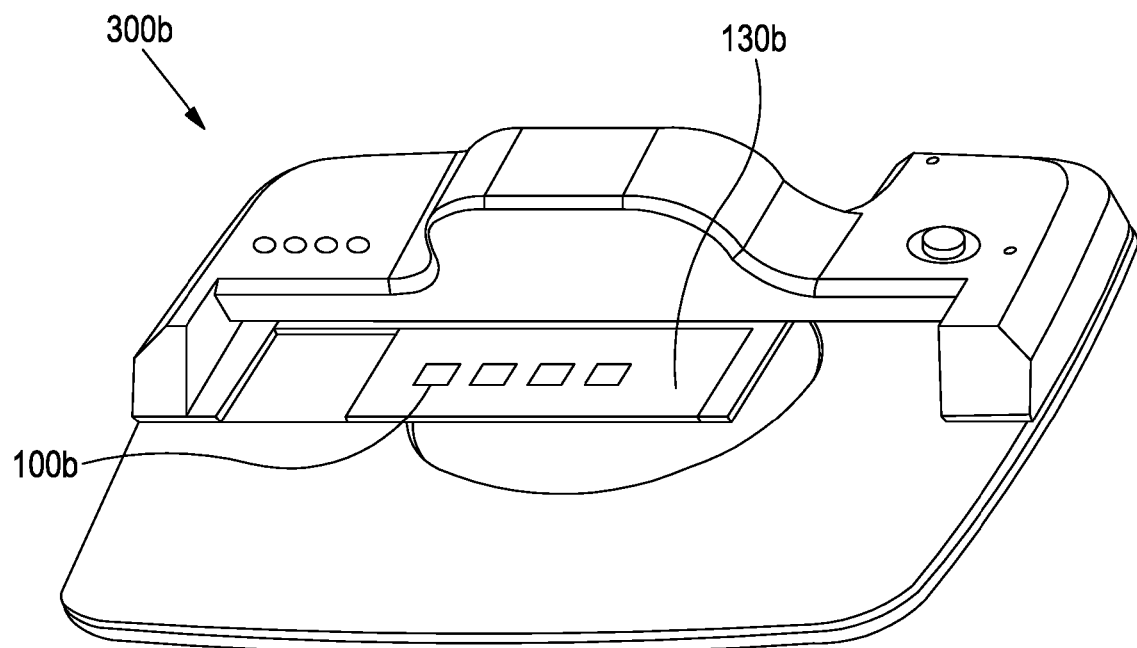
FIG. 32 shows the device of FIGS. 28-29, with the sample slide and holder of FIG. 27.

A view of the device 300b with a sample slide 100b and holder 130b is shown in FIG. 32. In this embodiment, the sample slide and holder are similar to the slide 100b and holder 130b as described with reference to FIG. 27.

The stage 330b also has openings 331b-334b, each opening being configured to be substantially adjacent or aligned with a respective sample receiving-portion 341b-344b and beam-receiving portion of the sample slide 340b.

It will be appreciated that, similarly to device 300 of FIGS. 15-16, device 300b may be configured for bi-directional movement of a sample slide with a plurality of wells arranged in rows, or movement of a plurality of sample slides in holders 100b and 130b.

Figure 30:
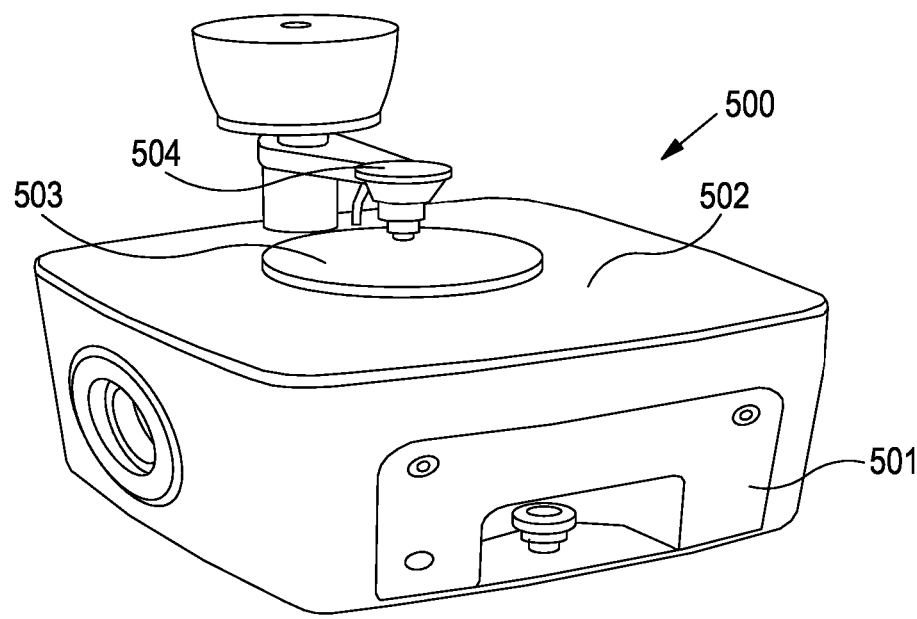
FIG. 30 shows a conventional Specac Quest ATR-FTIR accessory.

FIG. 30 shows a conventional Specac Quest ATR accessory 500 comprising an optical body 501 and a lid 502 which has a stage 503 to receive a sample on a conventional IRE and a compression arm 504 to maintain the IRE in position during analysis.

Figure 31:
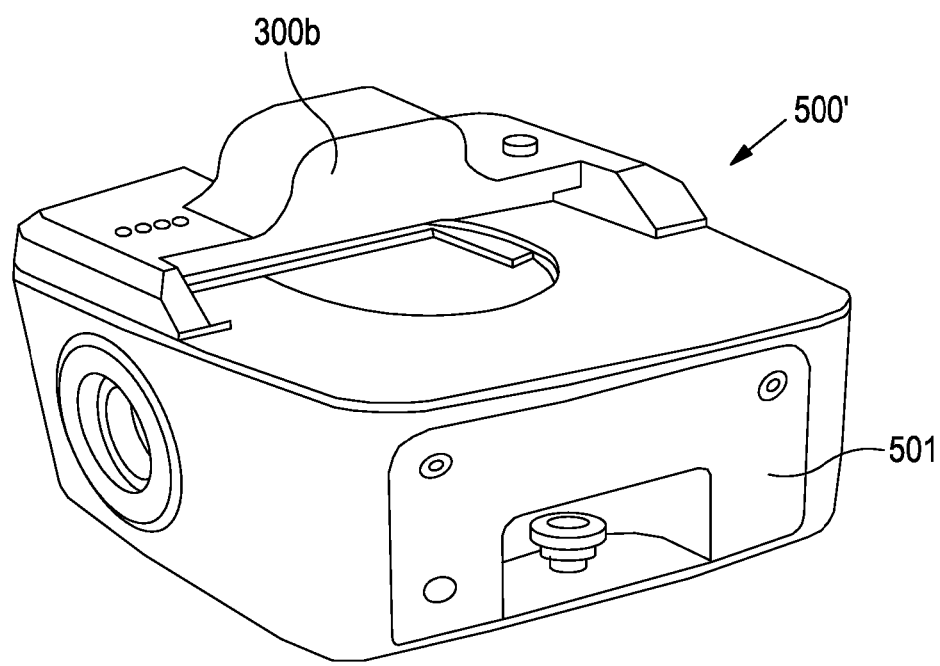
FIG. 31 shows the accessory of FIG. 30, fitted with a device according to an embodiment of the present invention.

FIG. 31 shows the accessory 500' of FIG. 30, with its lid 502 removed, and replaced by the device 300b of FIG. 28-29. The device 300b is thus sized and configured to be connected to and fitted onto the spectrometer optical body 501. By such provision, the device 300b is configured such that, when the device 300b is installed or fitted on the spectrometer body 501, the sample measuring location of the device 300b is located at or substantially at a location where a sample would be placed using a conventional sample slide during use of the accessory 500'. Thus, the device 300b may be considered to be an accessory for use with a conventional spectrometer.

A person of skill in the art will appreciate that other embodiments may be made which are sized and configured to fit other types of conventional spectrometers, such as, but not limited to as examples a Veemax optical accessory or those of a Perkin Elmer Spectrum Two or Thermo Fisher iS5 or Agilent Cary series, while using the same combination of a stage configured to receive a sample slide, and a moving mechanism configured to move the sample slide relative to a sample-measuring location.

With reference to the FTIR spectra shown in FIGS. 18 to 21, these spectra contain two peaks of absorption that are of particular interest: the strong peak of absorption in the 3200-3500 cm$^{-1}$ region which is characteristic of a water OH group, and the strong peak of absorption around 1690 cm$^{-1}$ which is characteristic of a primary amide group (as found in proteins).

Investigation of optimum angles of incidence are described with reference to FIGS. 18A-18C.

Figure 18A:
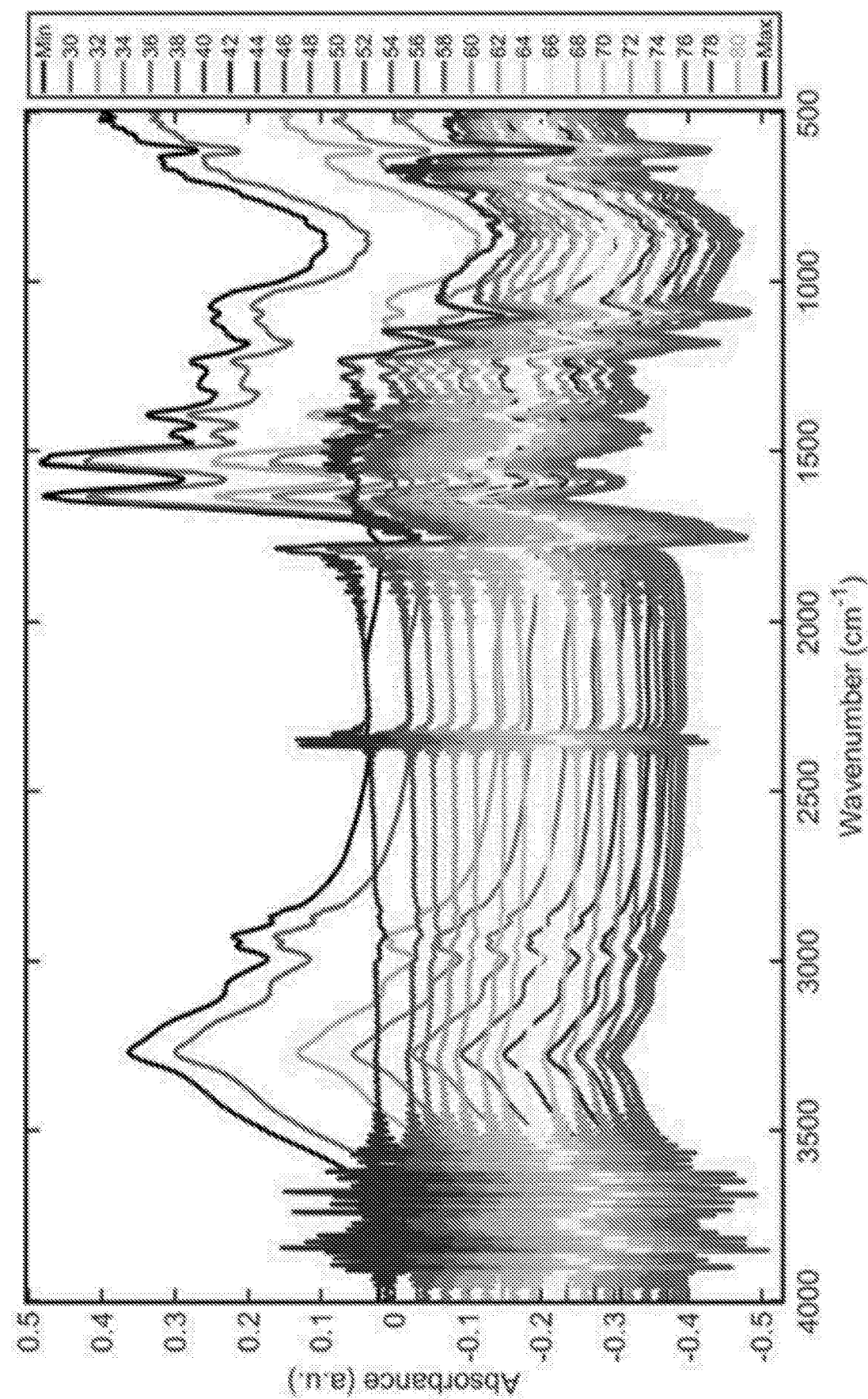
FIG. 18A is an ATR-FTIR spectrum showing investigation of an optimum angle of incidence for an IRE in the range of 30-80°.
Figure 18B:
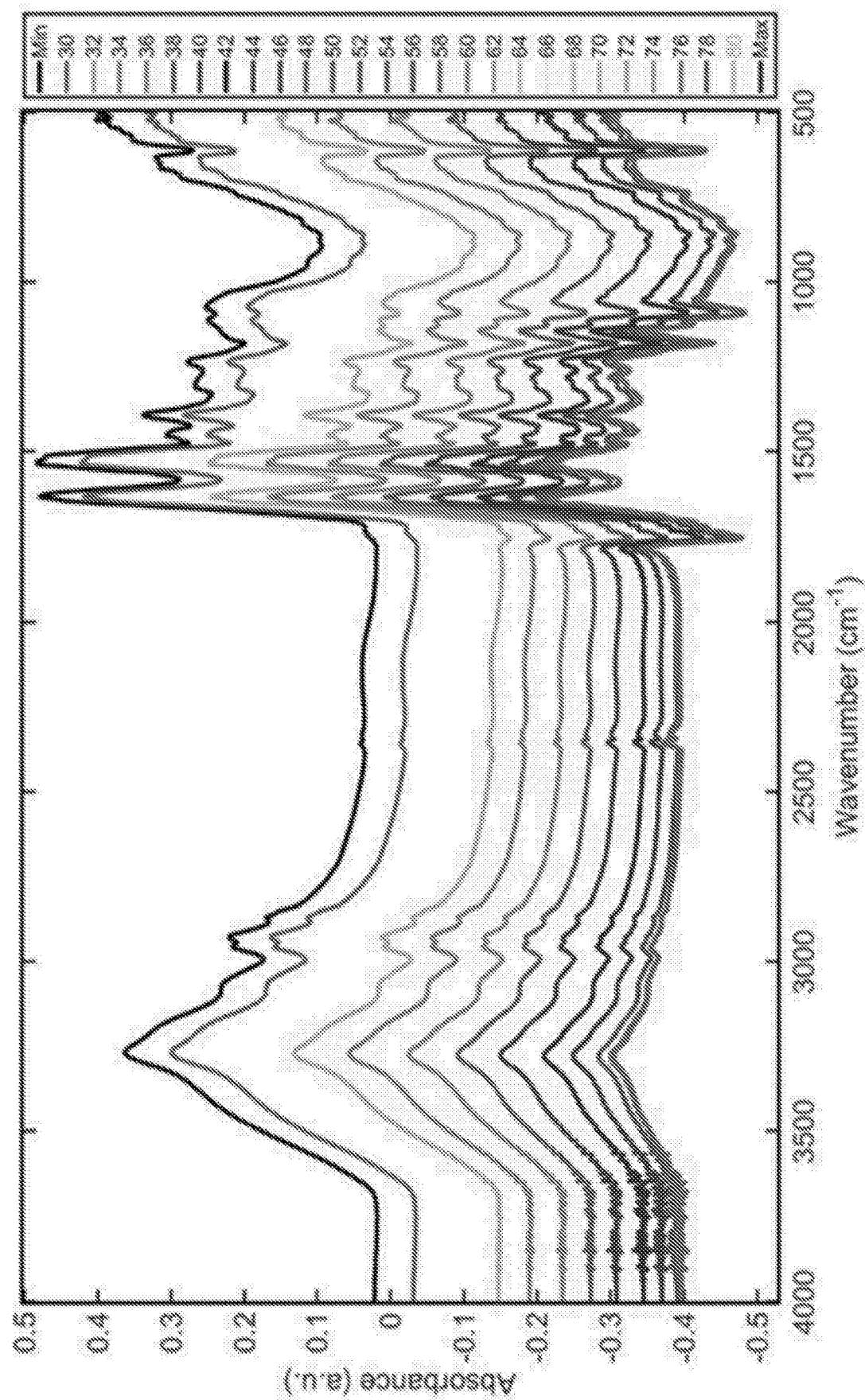
FIG. 18B is an ATR-FTIR spectrum showing investigation of an optimum angle of incidence for an IRE in the range of 30-50°.
Figure 18C:
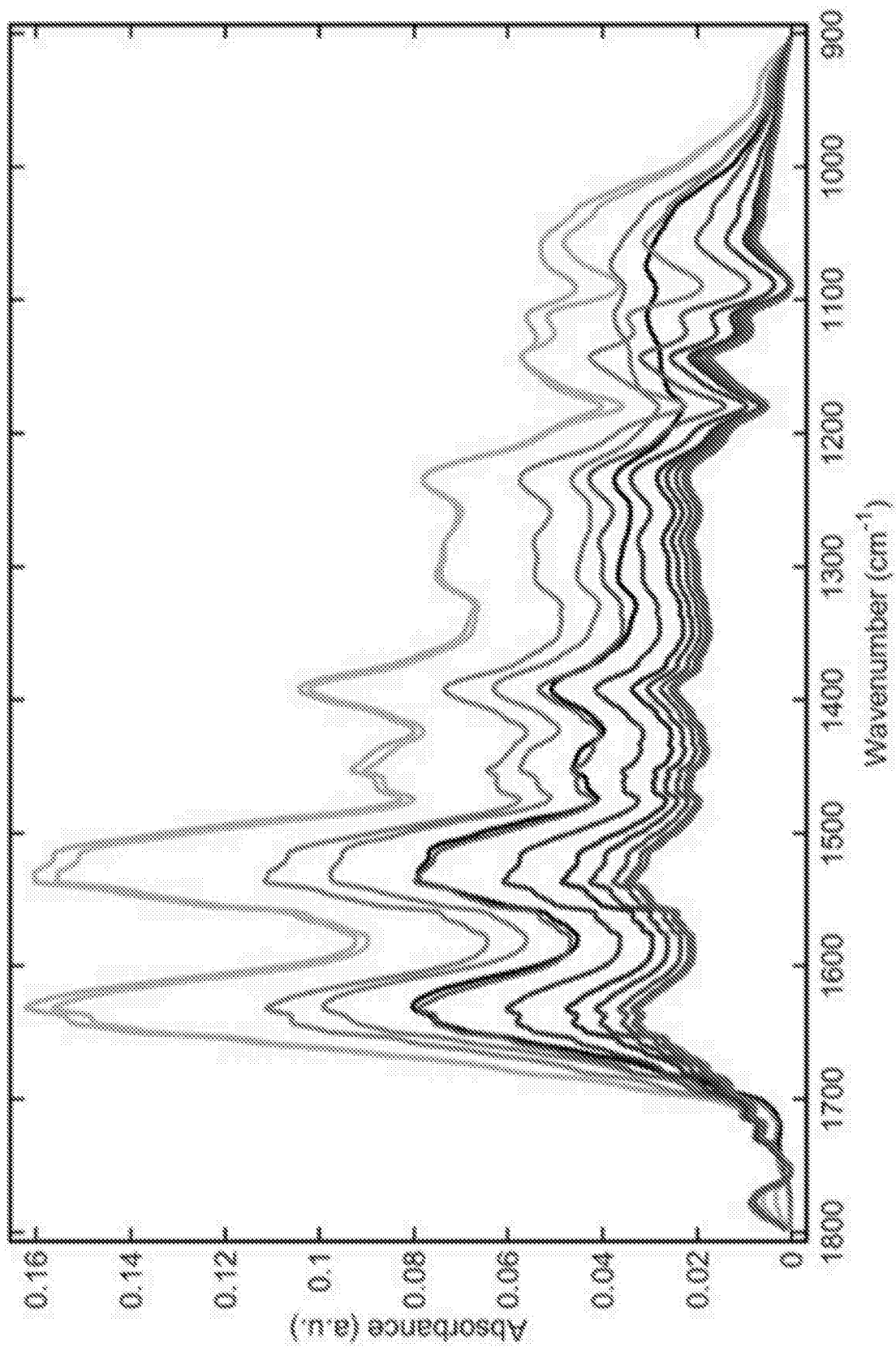
FIG. 18C is an ATR-FTIR spectrum showing investigation of an optimum angle of incidence for an IRE in the range of 30-50°, following spectral pre-processing.

FIG. 18A is an ATR-FTIR spectrum showing absorbance for different angles of incidence in the range of 30-80°. In FIG. 18B, the angles of incidence have been reduced to a range of 30-50°, as these angles were identified as providing optimum results. FIG. 18C is similar to the spectrum of FIG. 18B, but following spectral pre-processing, focussing on the absorbance region characteristic of primary amides. Spectral pre-processing typically involves a wavenumber selection approach to effectively 'cut' a fingerprint region of the spectrum, where typically the majority of biological molecules will present. Spectral pre-processing also typically includes a baseline correction (rubberband), to adjust for any scattering properties in the spectrum. Finally, and vector normalisation can be applied, which reduces the influence of sample inconsistencies, such as differences in thickness.

Figure 19:
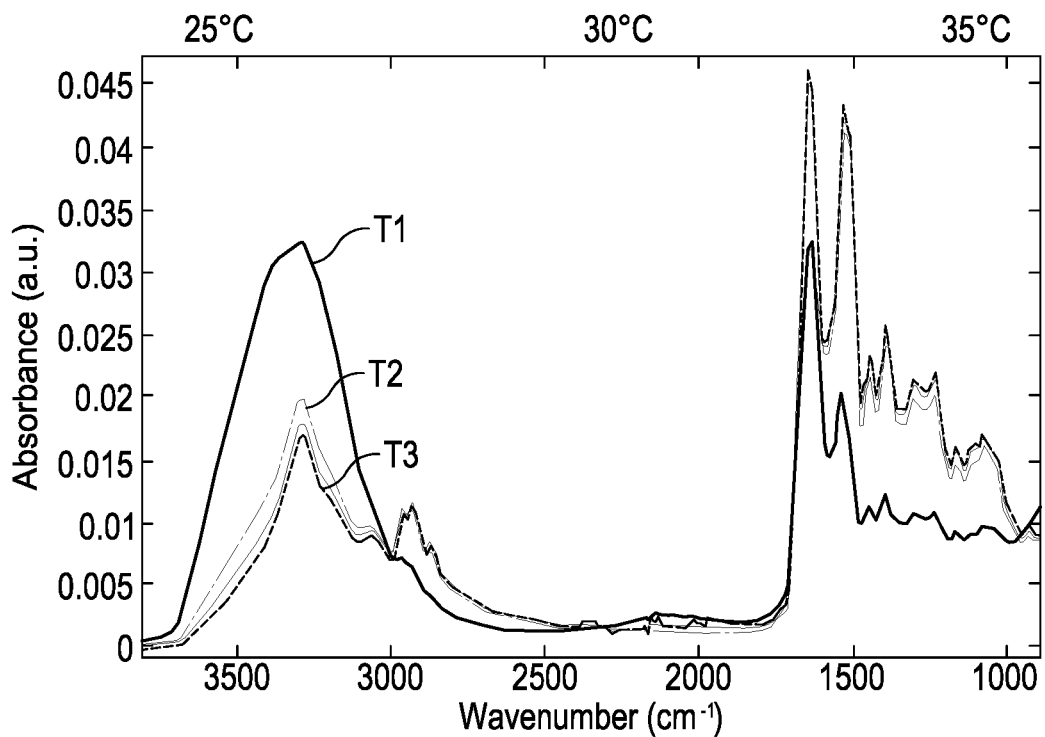
FIG. 19 is an ATR-FTIR spectrum showing the effect of the temperature used to dry a sample before analysis.
Figure 20:
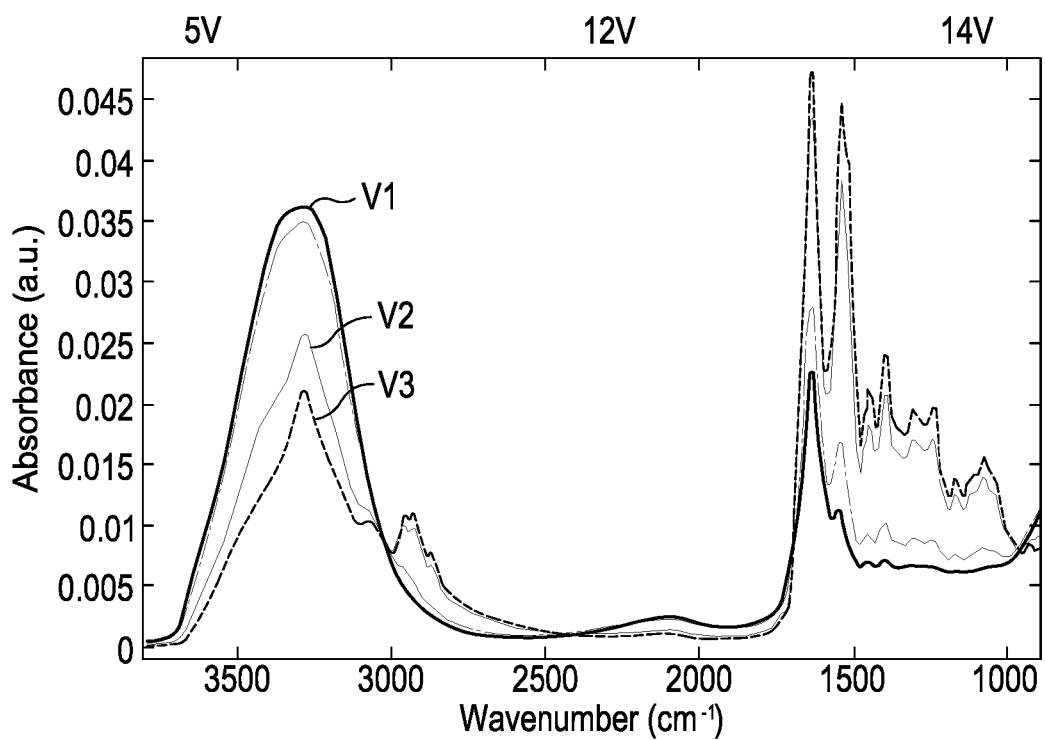
FIG. 20 is an ATR-FTIR spectrum showing the effect of air flow applied to dry a sample before analysis.
Figures 21, 22:
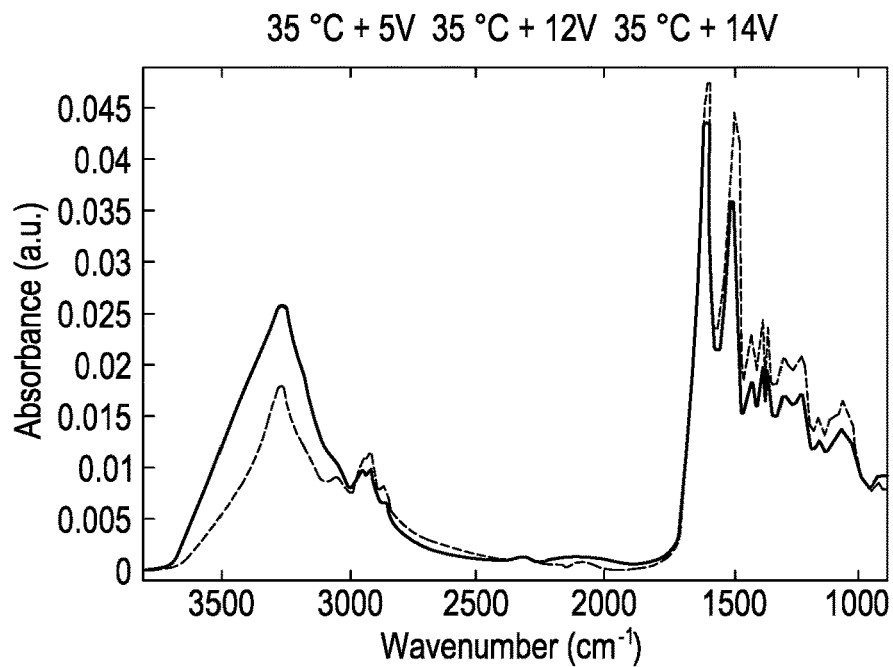
FIG. 21 is an ATR-FTIR spectrum showing the combined effect of temperature and air flow applied to dry a sample before analysis.
FIG. 22 is a Table showing the mean area under a curve corresponding to the peak of absorbance for the hydroxyl group for different temperatures.

In the spectra shown in FIGS. 19 to 21, protein-containing serum samples were analysed, under varying drying conditions.

It has been discovered that, surprisingly, the drying conditions may affect the quality and reproducibility of the spectra obtained during subsequent analysis. In particular, it has been discovered that certain drying conditions may lead to improved reproducibility of analysis and/or sharpness in the spectra.

FIG. 19 is an ATR-FTIR spectrum showing the effect of the temperature used to dry a sample before analysis. A 1 µL serum sample was deposited on a sample slide of the present invention and dried for 8 minutes at temperatures of T1=25° C., T2=30° C., and T3=35° C. It can be seen that drying the sample at 35° C. not only reduced the water content in the sample (smaller absorbance in the 3200-3500 $cm^{-1}$ region), but also improved the absorption reading in the sample in relation to the primary amide group (absorption around 1690 $cm^{-1}$), compared to samples dried for the same duration at lower temperatures.

FIG. 20 is an ATR-FTIR spectrum showing the effect of air flow applied to dry a sample before analysis. A 1 µL serum sample was deposited on a sample slide of the present invention and dried for 8 minutes at room temperature of approximately 20° C. under air flows corresponding to a fan voltage of V1=5V, V2=12V, and V3=14V. It was measured that a fan voltage of 5V corresponded to a flow rate of approximately 15 $m^3/h$, a fan voltage of 12V corresponded to a flow rate of approximately 99 $m^3/h$, and a fan voltage of 14V corresponded to a flow rate of approximately 113 $m^3/h$. It can be seen that drying the sample using a 14V fan voltage (hence under higher air flow) not only reduced the water content in the sample (smaller absorbance in the 3200-3500 $cm^{-1}$ region), but also improved the absorption reading in the sample in relation to the primary amide group (absorption around 1690 $cm^{-1}$), compared to samples dried for the same duration at lower fan voltages (hence under lower air flow).

FIG. 21 is an ATR-FTIR spectrum showing the combined effect of temperature and air flow applied to dry a sample before analysis. A 1 µL serum sample was deposited on a sample slide of the present invention and dried for 8 minutes at 35° C. under air flows corresponding to a fan voltage of V1=5V, and V3=14V. It can be seen that, while a sample dried at 35° C. under low air flow (fan voltage of 5V) showed low moisture content and good primary amide absorbance peak, increasing the flow rate (fan voltage of 14V) further reduced the water content in the sample, and improved the sharpness of the primary amide peak of absorption.

FIG. 22 is a Table showing the mean area (in arbitrary absorbance $units^2$ ($au^2$)) under a curve corresponding to the peak of absorbance for the hydroxyl group (absorbance in the 3200-3500 $cm^{-1}$ region) for different temperatures and drying times. It is clear from FIG. 22 that increasing the drying temperature to 35° C. reduced the water content in the sample compared to samples dried at lower temperatures. It can also be seen that increasing fan voltage (and hence the air flow rate) also reduced the water content in the sample compared to samples dried at lower fan voltages. Finally, it can be seen that the combined effect of a drying temperature of 35° C. with a high air flow (12V or 14V fan voltages) produced the best results. In particular, the drying time required to dry the sample was significantly reduced at 35° C. compared to lower temperatures. For example, a value of less than 12 was achieved after a drying time of 2 minutes under a temperature of 35° C. and with fan voltage of 5V, 12V or 14V, whereas, at 30° C., the water content was higher even after 6 minutes drying time.

FIG. 23 is a Table showing the mean intensity corresponding to the peak of absorbance for the amide I group for different temperatures. It can be observed that increasing the temperature and air flow each led to increased absorbance intensity characteristic of the amide I group. In other words, there was a clear correlation between the dryness of the sample (low water content as observed in FIG. 22) and the measured intensity of the amide I peak absorbance in the sample, which was unexpected.

FIG. 24 is a Table showing the standard deviation for measurements corresponding to the peak of absorbance for the hydroxyl group for different temperatures. FIG. 25 is a Table showing the standard deviation for measurements corresponding to peak of absorbance for the amide I group for different temperatures.

The standard deviation is representative of the reproducibility, with a lower standard deviation meaning better reproducibility. It can be seen from FIGS. 24 and 25 that drying the sample at higher temperature (35° C.) and under air flow each improved reproducibility of the ATR-FTIR analysis, with the best results being achieved for a combination of a drying temperature of 35° C. with application of air flow.

Figure 26:
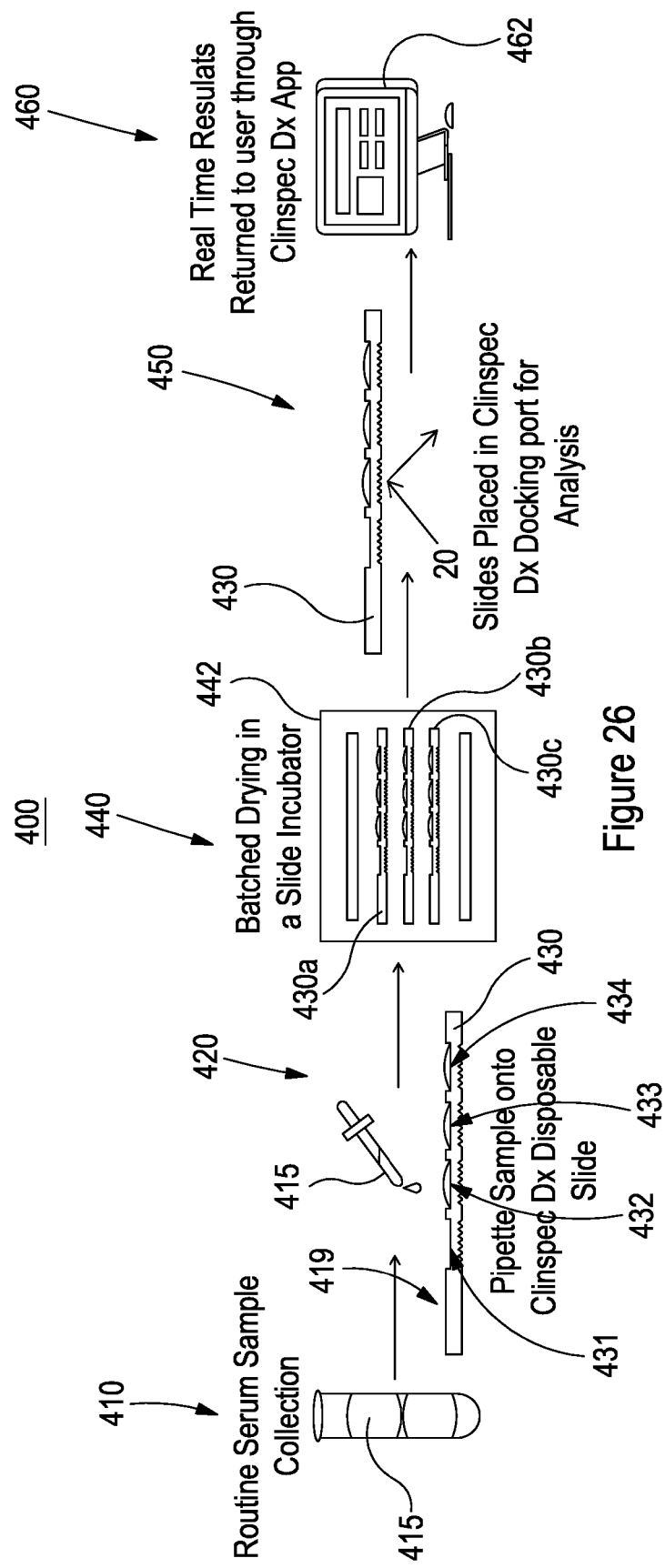
FIG. 26 is a schematic view of a method for analysing a sample according to an embodiment of the present invention.

FIG. 26 is a schematic view of a method 400 for analysing a sample according to an embodiment of the present invention.

Step 410 illustrates the step of collecting a serum sample 415. Whole blood was drawn from a patient. Following this the blood underwent a centrifugation step to isolate the blood serum other blood components. Typically, a minimum of 5 ml of serum is required per patient. Samples were snap-frozen for storage and thawed to room temperature for analysis.

Step 420 illustrates the step of dispensing a serum sample 415 on onto a sample slide 430. The sample slide 430 was a slide according to an embodiment of the present invention as described with reference to FIGS. 3-7 and 11-12.

5 µL of a samples were pipetted into wells 432, 433 and 434, while well 431 was left empty, to be used as background control.

Step 440 illustrates the step of drying a batch of slides 430a, 430b, 430c. The slides were stacked and placed in a drying unit 442 for drying. The drying unit 442 was set to a temperature of about 35° C. and the slides were allowed to dry for about 2 minutes using a 5V fan to provide an air flow rate of about 15 $m^3/h$.

Step 450 illustrates the step of performing spectral analysis of the samples.

The instrument used in the analysis of the samples is a Spectrum 2™ FTIR spectrometer from Perkin Elmer. This spectrometer is fitted with an accessory device 300 as described in the embodiment of the present invention referring to FIGS. 15-17. This facilitates high-throughput analysis of samples. The slide 430 was provided with an identifier 439 fixed on one end of the slide 430 to easily and reliably identify the original of the samples. In this embodiment, the closest well 431 to the identifier 439 was used as a 'background' well 431. Typically, the slides 430 were placed on the stage 330 of the device 300 such that the background well 431 is analysed first by the spectrometer. A person of skill in the art will appreciate that the purpose of a blank well is to serve as a background scan of the environment for the spectrometer instrument. This collects all spectral information from the environment and removes it from the data collected from the subsequent serum samples. Therefore, a background measurement is typically carried out before analysis of samples to be analysed. This ensures that, in the context of analysing serum samples, important information from the serum is not obscured by components in the surrounding environment.

As described with reference to FIGS. 15-17, once ATR-FTIR measurement is complete for first well 431, the apparatus 300 moves the slide 430 relative to the sample-measuring location 320, for the sample in the second well 432 to be analysed. Thus, each sample in wells 431,432, 433,434 is analysed by ATR-FTIR spectrometry without the need to remove the slide 430 between measurements.

The spectrometer was configured in the following manner: a resolution of 4 $cm^{-1}$, a 4 $cm^{-1}$ aperture, and with 32 scans per sample and background. This is a standard ATR-FTIR spectrometer setting which allows spectra to be taken typically in under a minute.

Step 460 illustrates the step of processing the data and presenting the information to a user via a user interface 462. The present method allows results to be delivered in real time and presented to the user as with a simple interface 462 displaying the result with the percentage level of confidence.

Once analysis has been completed, the slide 430, which also acts as the IRE for each well 431,432,433,434, may be disposed of appropriately, as will typically be treated as biological waste for disposal. Alternatively, the slide 430 may be stored for future reference, or cleaned and re-used as appropriate to the application.

Experimental Data

Figure 33:
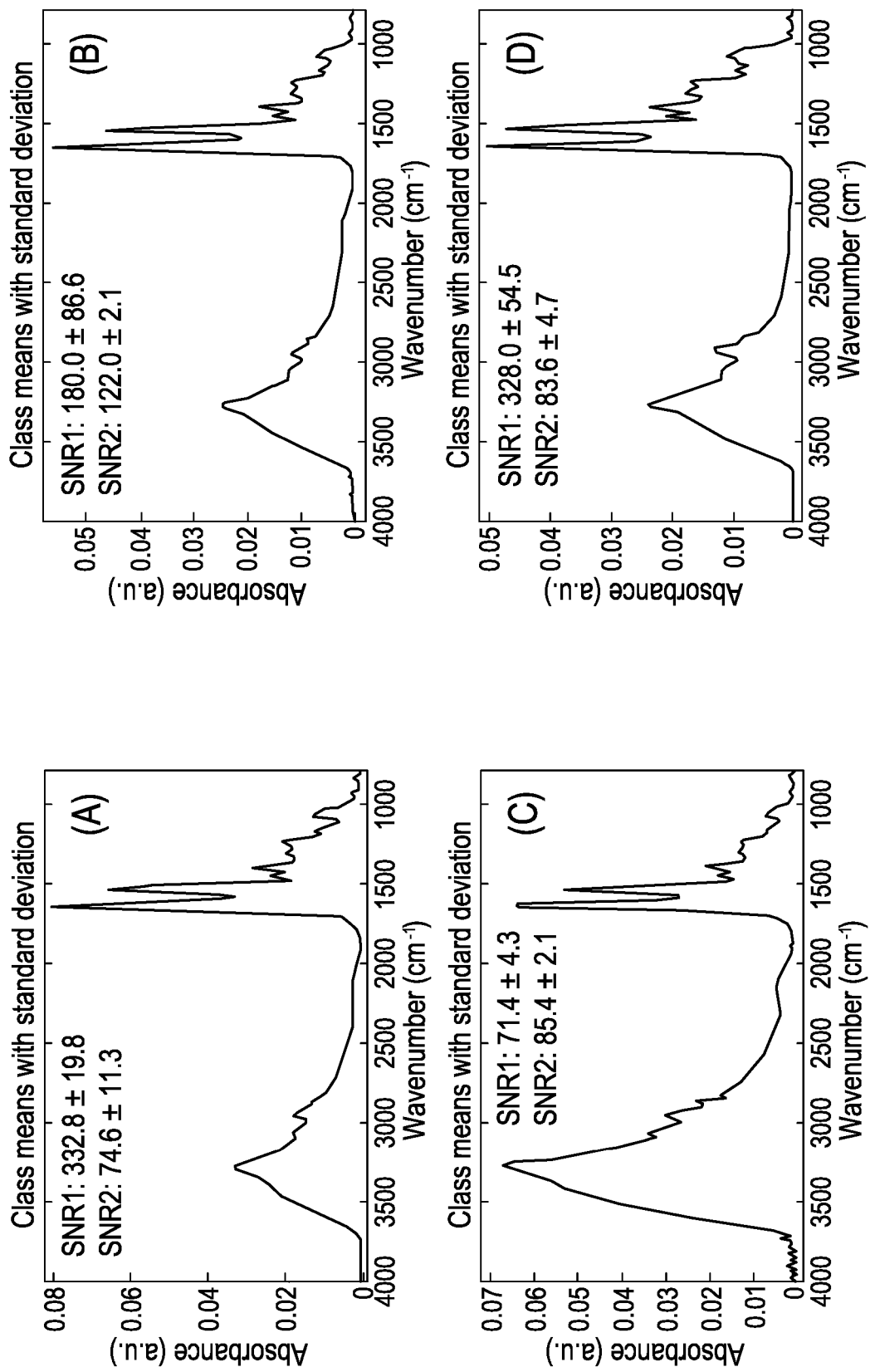
FIG. 33 shows a comparison of spectral quality between three FTIR instruments using a sample slide of FIG. 3 (FIGS. 33(A)-(C)), and a gold-standard diamond ATR accessory (FIG. 33(D))

Use of Sample Slide with Conventional Spectrometers (FIG. 33)

A sample slide according to an embodiment of the present invention was prepared, consistent with the embodiment of FIGS. 3-6. The slide was made of silicon.

A sample was prepared with human pooled serum, and applied to each of the three sample wells, the first well being used for baseline reference. The same sample slide was used throughout so as to reduce any differences arising from sample preparation. A single spectrum was obtained from each sample well and recorded. Spectra were then pre-processed using a rubberband baseline correction followed by vector normalisation. These steps aim to negate any background effects arising from unwanted light scattering, as well as sample variations such as thickness which can have multiplicative effects on the spectra. Pre-processing thus makes all spectra comparable.

To compare data regarding spectral quality, and thus system performance, values of signal-to-noise (SNR) were extracted. A higher SNR can be regarded as preferable as important spectral information is larger in comparison to the unwanted background noise. SNR can be calculated by comparing intensity values of a 'signal' region against a 'noise' region. The amide I peak of a biological spectrum is often the most intense due to fundamental vibrations from protein and thus the maximum absorbance value of this peak is often used as a signal region. Noise values can be obtained from anywhere in the IR spectrum that is free of vibrational modes found in biological samples and modes arising from ambient conditions. The regions between 4000-3700 $cm^{-1}$, 2800-2500 $cm^{-1}$, 2000-1800 $cm^{-1}$ and below 900 $cm^{-1}$ are commonly chosen noise regions. In this instance, maximum absorbance values between 1900-1850 $cm^{-1}$ and 900-850 $cm^{-1}$ were selected as two separate measures of signal quality. The former area was chosen to avoid contributions from the water overtone region; the latter, to encompass loss of sensitivity in lower wavenumbers due to the use of silicon, whilst also addressing limitations in detector sensitivity.

FIG. 33 shows a comparison of spectral quality between three FTIR instruments using a sample slide of FIG. 3 (FIGS. 33(A)-(C)), and a gold-standard diamond ATR accessory (FIG. 33(D)), and in particular:
(A) Perkin Elmer Spectrum 2 FTIR,
(B) Thermo Fisher Nicolet is 5 FTIR,
(C) Agilent Technologies Cary 670 FTIR, and
(D) Perkin Elmer Spectrum 2 with uATR accessory (gold standard).

SNR values are given for each set of spectra, with the amide I peak absorbance compare to the maximum absorbance value in the 1900-1850 $cm^{-1}$ region (SNR1), and the maximum absorbance in the 900-850 $cm^{-1}$ region (SNR2)

It can be seen from FIG. 33(D) that the gold standard approach of using a commercially available ATR accessory with integrated diamond crystal yields high quality spectra with high SNR. FIGS. 33(A)-(C) show that using the samples slides according to an embodiment of the present invention, integrated onto a universal ATR accessory (using a Slide Indexing unit), in conjunction with three other commercially available spectrometers, the Perkin Elmer Spectrum 2 FTIR spectrometer produces spectra with equivalent quality to the gold standard approach (FIG. 33(A)). Good quality spectra are also acquired from Thermo Fisher Nicolet iS 5 (FIG. 33(B)) and Agilent Cary 670 (FIG. 33(C)) systems.

Figure 34:
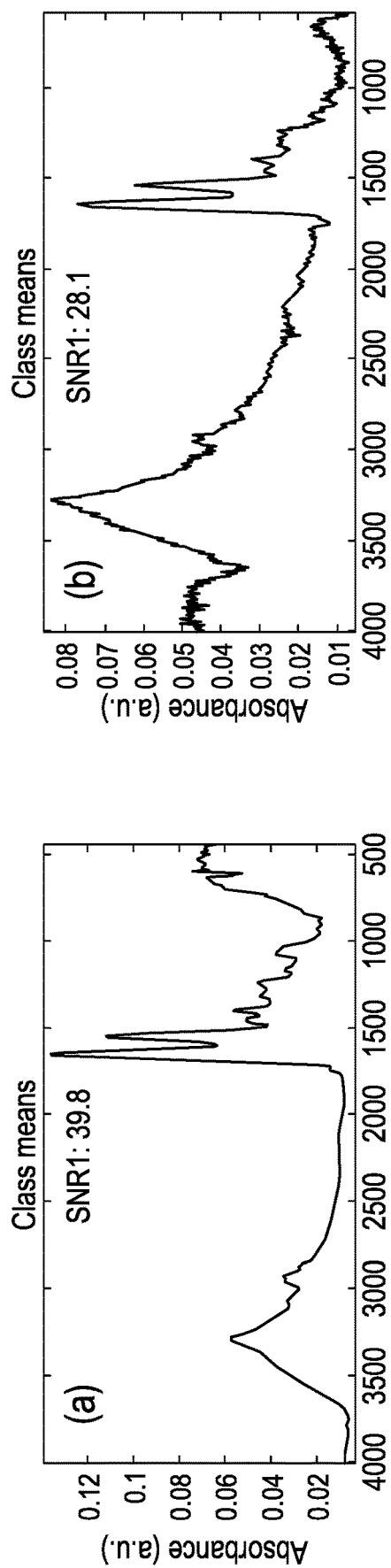
FIG. 34 shows alternative approaches for SIRE integration in a FTIR spectrometer and relative SNR1 values, depicting; (a) the sample slide of FIG. 3 on an adapted ATR accessory; and (b) the sample slide of FIG. 3 on a specular reflectance accessory.

Comparison of Silicon IREs ('SIREs') (FIG. 34)

Alternative approaches to the approach described in relation to FIG. 33 were explored using adapted IRE interfaces with commercially available ATR (FIG. 34(*a*)) and specular reflectance accessories (FIG. 34(*b*)). As shown in FIG. 34, the SNR for each approach is distinctly lower than the spectral quality obtained from a gold-standard approach such as a diamond IRE system, and considerably less than the system described above and investigated in relation to FIG. 33.

Figure 35:
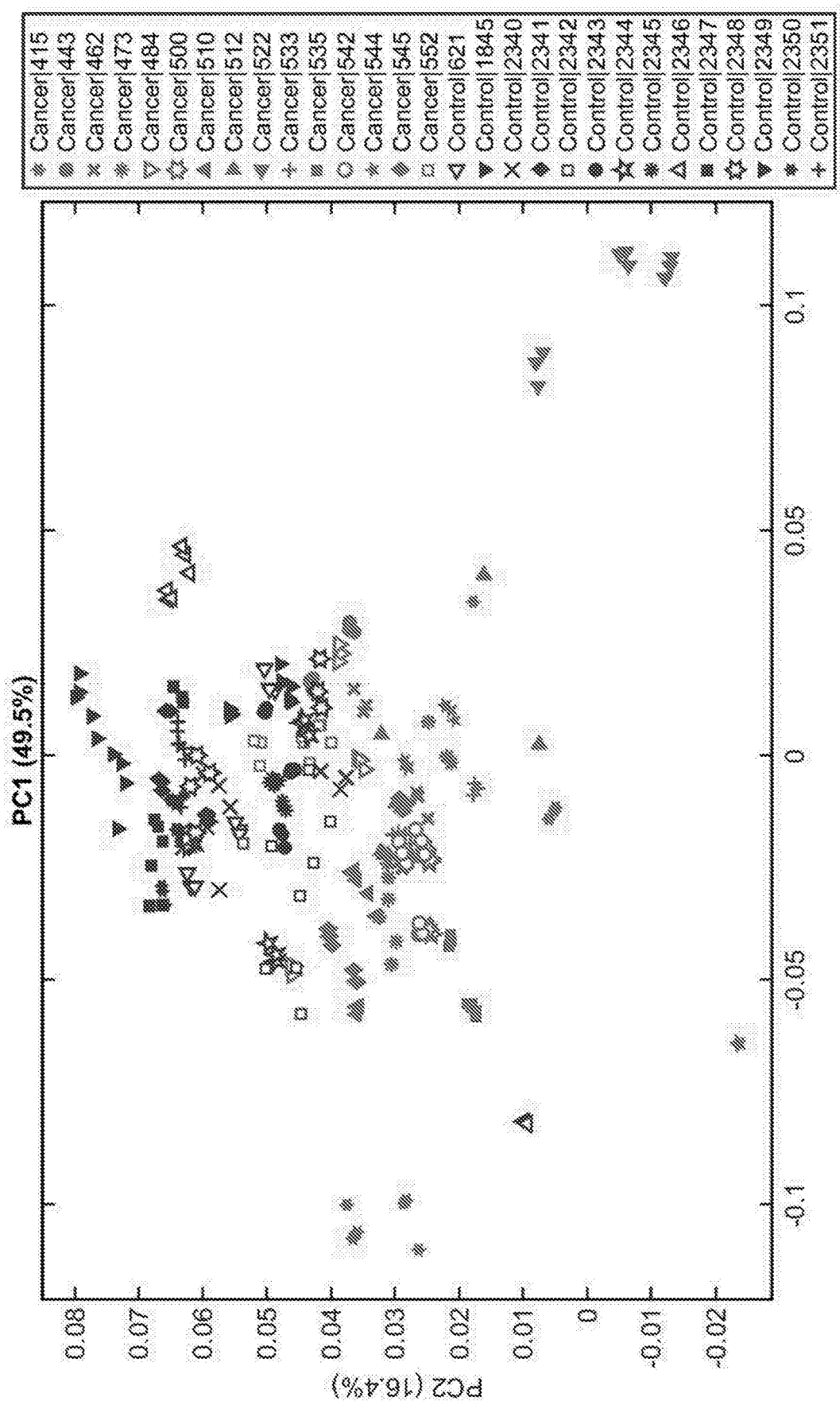
FIG. 35 illustrates a principal component analysis (PCA) scatter plot of GBM (red) and non-cancer (blue) patients, with individual patients labelled so as to observe variability between SIRE wells.

Clinical Classification Study on SIREs (FIG. 35)

The diagnostic performance of ATR-FTIR has been established using proof-of-concept studies using diamond IRE based ATR. These retrospective studies determined that brain tumour patients could be distinguished at sensitivities and specificities of 92.8% and 91.5% respectively. In order to investigate the diagnostic performance of a SIRE-based approach, a small classification study was conducted on 15 glioblastoma multiforme (GBM) and 15 control patients. A small study such as this would provide an indication of potential performance of this new approach. One important consideration with a small dataset is that some computational methods would not be suitable, due to the risk of overfitting and insufficient validation.

For all patients, 3 μL of serum was pipetted onto each of the wells '1', '2' and '3' on a sample slide according to the embodiment of FIG. 3, and allowed to dry at room temperature (20-22° C.). Three spectra were obtained per well resulting in 9 spectra per patient, and an overall total of 270 spectra. Spectra were pre-processed by cutting to the fingerprint region (900-1000 cm$^{-1}$), second-order differentiated and vector normalised. As the number of spectra is less than the number of variables in the dataset, supervised analysis was deemed unsuitable and as such multivariate analysis, in this case principal component analysis (PCA), was conducted to observe differences between cancer and non-cancer patients (FIG. 35).

PCA is a technique used to emphasize variation and highlight patterns in a dataset. In the present case, the PCA transformation was carried out in 2 dimensions, with the first principal component (PC1) being associated with the wavenumber and absorbance showing the largest variance in the dataset, and the second principal component (PC2) being associated with the wavenumber and absorbance showing the second largest variance in the dataset. In other words, PCA analysis reduces a spectrum into variables that account for variance within the dataset. As such, when these variables are compared against each other in a scatterplot, separation between classes in the axes suggests biological variation. Conversely, relative closeness or overlap suggests biological similarity.

If cancer and non-cancer appear to separate in a PCA scatter plot, this suggest that the two classes are distinguishable using the FTIR approach. What can be seen in FIG. 35 is that there is a distinct split between cancer and non-cancer patients, with very little overlap. This is promising for any subsequent analysis, such as the use of classification algorithms that would extract sensitivity and specificity, as an unsupervised approach is able to initially identify spectral differences indicative of disease status.

A further clinical classification study was carried out for patients suffering from melanoma. The approach taken was similar to the above study as illustrated in FIG. 35, but with regard melanoma-type cancers rather than brain tumors.

Figure 42:
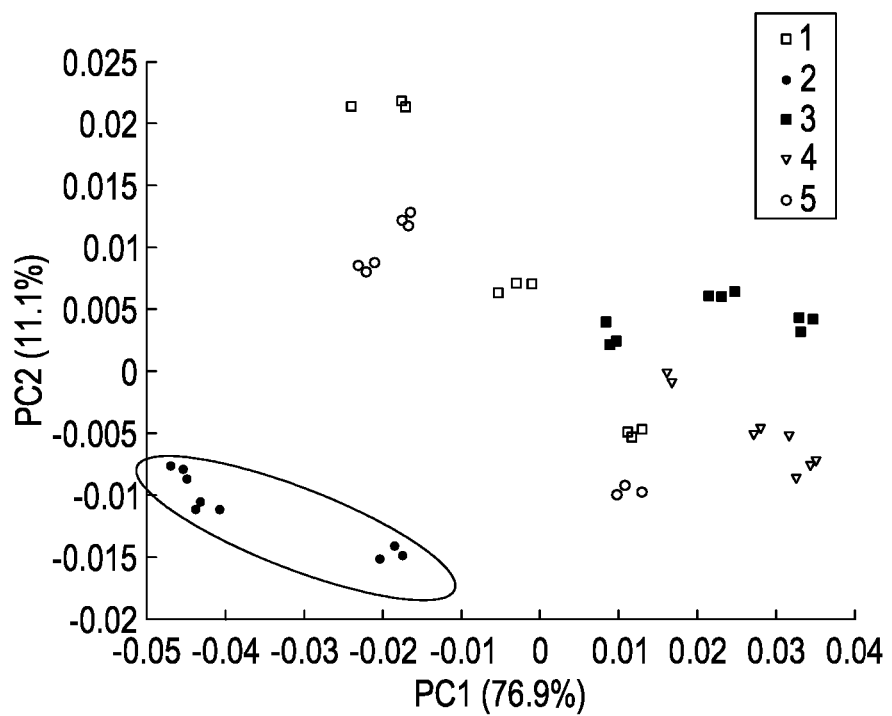
FIGS. 42-44 illustrate a principal component analysis (PCA) scatter plot of three different patients undergoing treatment for melanoma.
Figure 43:
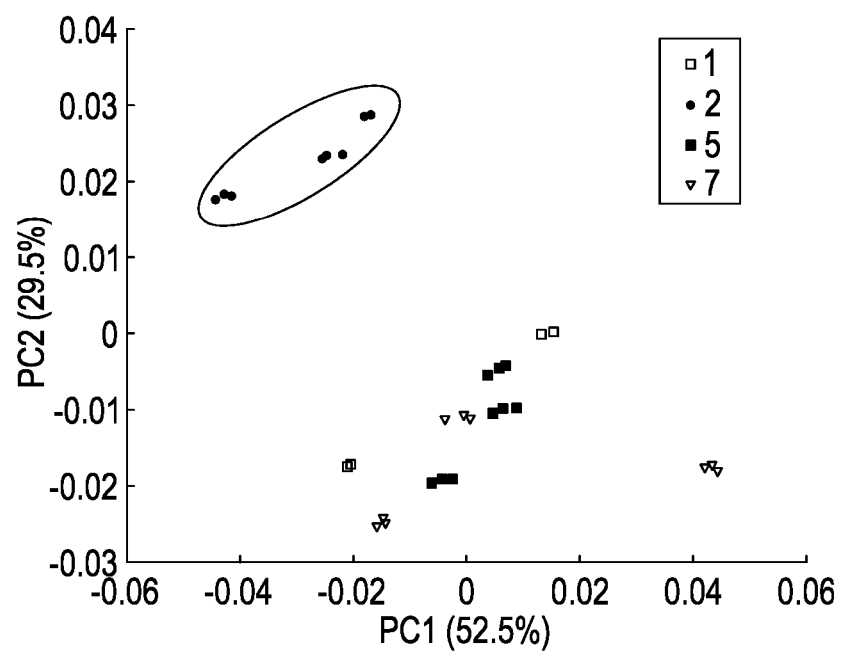
Figure 44:
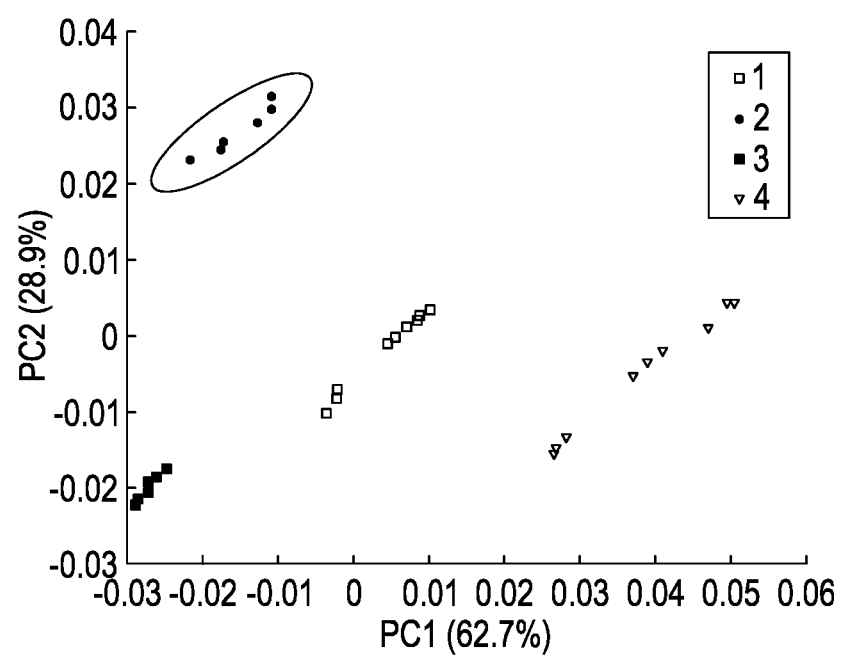

FIGS. 42-44 shows the results of a principal component analysis (PCA) carried out for three different patients being monitored during the course of their treatment. The sample analysis in each case was carried out as described in the method 400 of FIG. 26, followed by PCA analysis.

With reference to FIG. 42, samples taken from five different patient visits were analysed. The patient had melanoma in visit 1, and a relapsed occurred at visit 3. As shown in FIG. 42, PCA analysis of the results showed that the samples associated with visit 2 were distinctively different and separated from the other samples. The results shown on FIG. 42 clearly show that the present method allow identification of the presence or absence of cancer (in this case melanoma) in a patient's biological sample.

Similarly, with reference to FIG. 43, the patient had melanoma in visit 1, and a relapsed occurred at visit 3. Again, PCA analysis of the results showed that the samples associated with visit 2 (no melanoma) were distinctively different and separated from the other samples (melanoma).

The patient associated with FIG. 44 was different in the sense that the patient had no melanoma in visits 1, 3 and 4, but a relapsed occurred at visit 2. Thus, in this case, the samples which were distinctively different and separated from the other samples were the samples which identified the presence melanoma.

FIGS. 45-49 illustrate the results of spectral analyses carried out using a method according to an embodiment of the present invention, in respect of bacteria samples.

Figure 45:
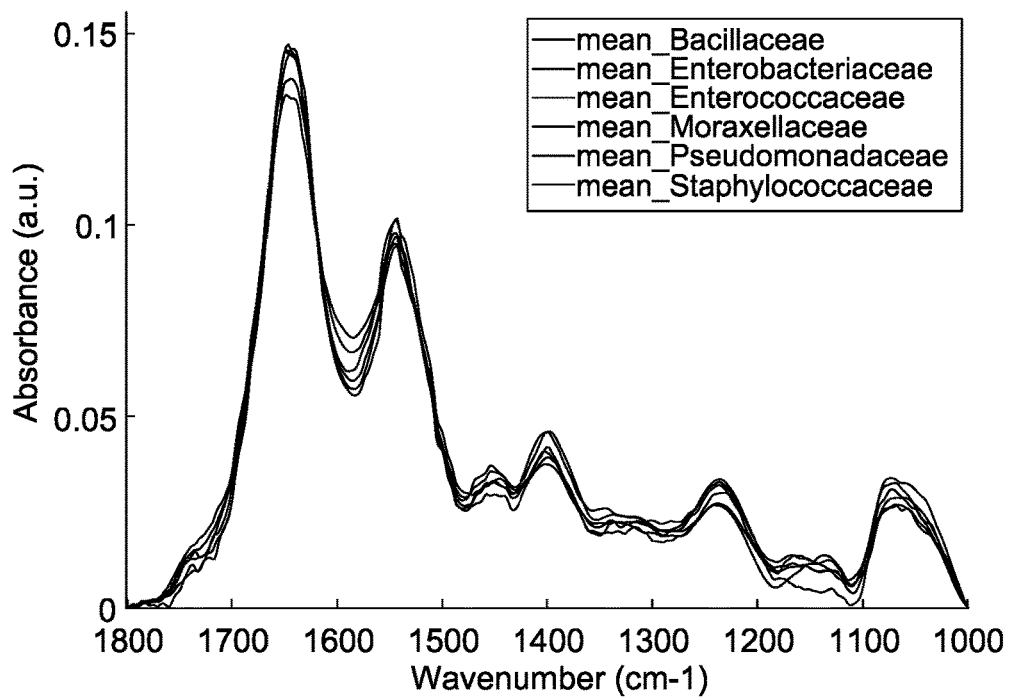
FIGS. 45-49 illustrate the results of a spectral analysis carried out using a method according to an embodiment of the present invention, in respect of bacteria samples.

FIG. 45 shows average spectral data highlighting spectral differences in the six different bacteria families that the 86 samples that were analysed belong to.

Figure 46:
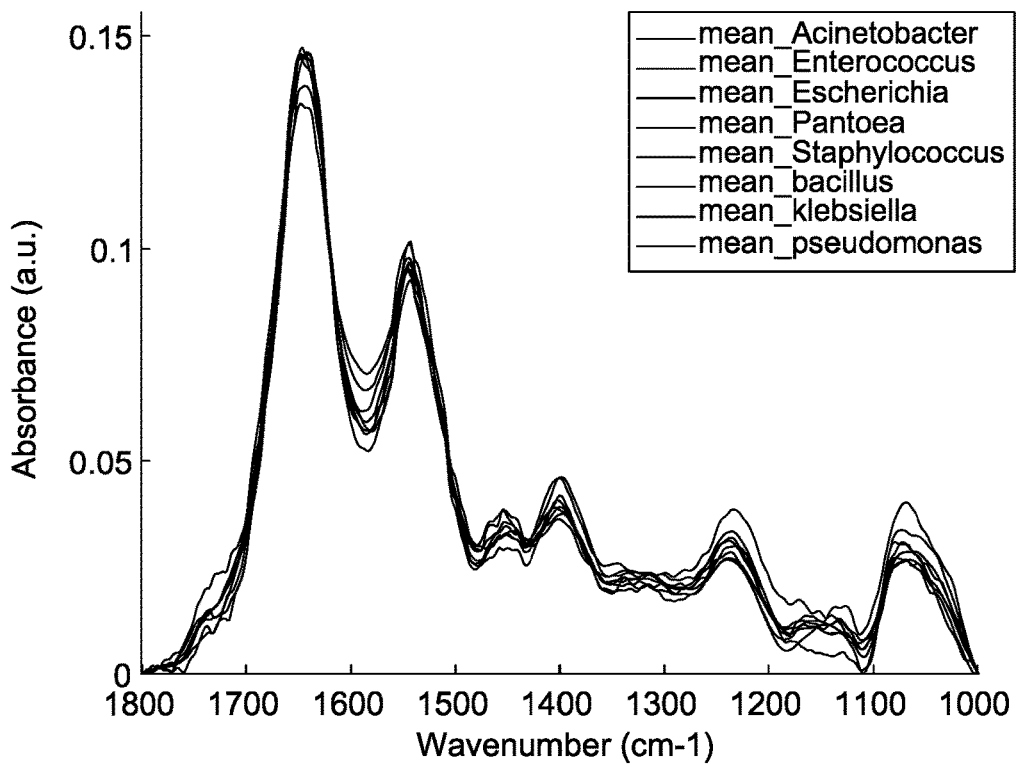

FIG. 46 shows average spectral data highlighting spectral differences in bacteria according to bacteria genus.

Figures 47, 48:
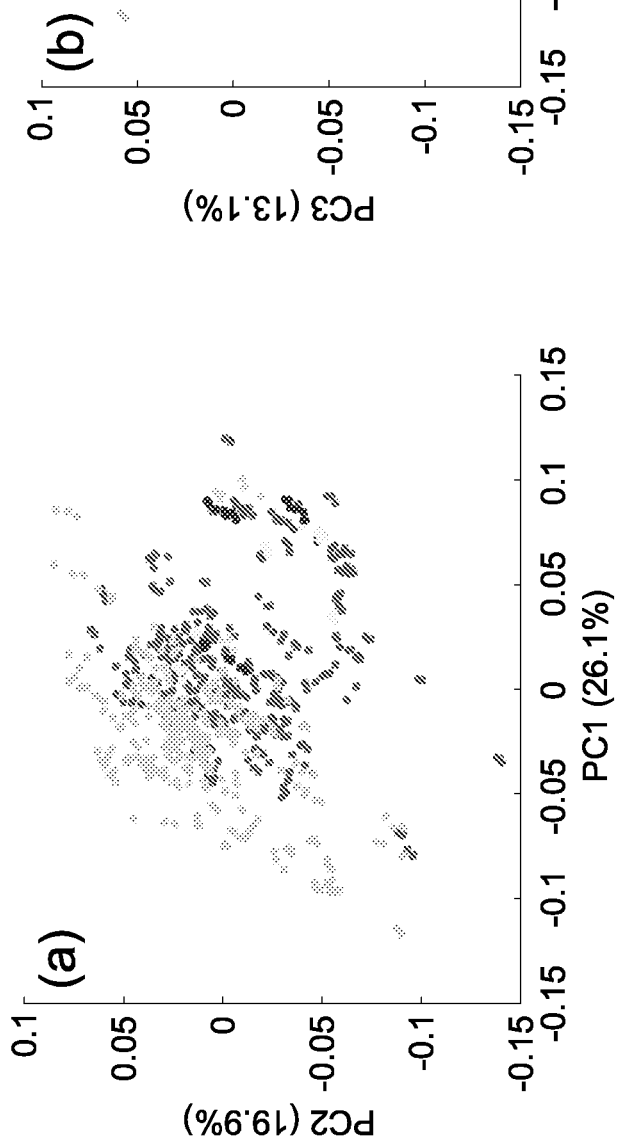

FIGS. 47-48 show PCA analysis PC1 vs PC2, and PC1 vs PC3, respectively, highlighting the differences between bacteria families.

Figure 49:
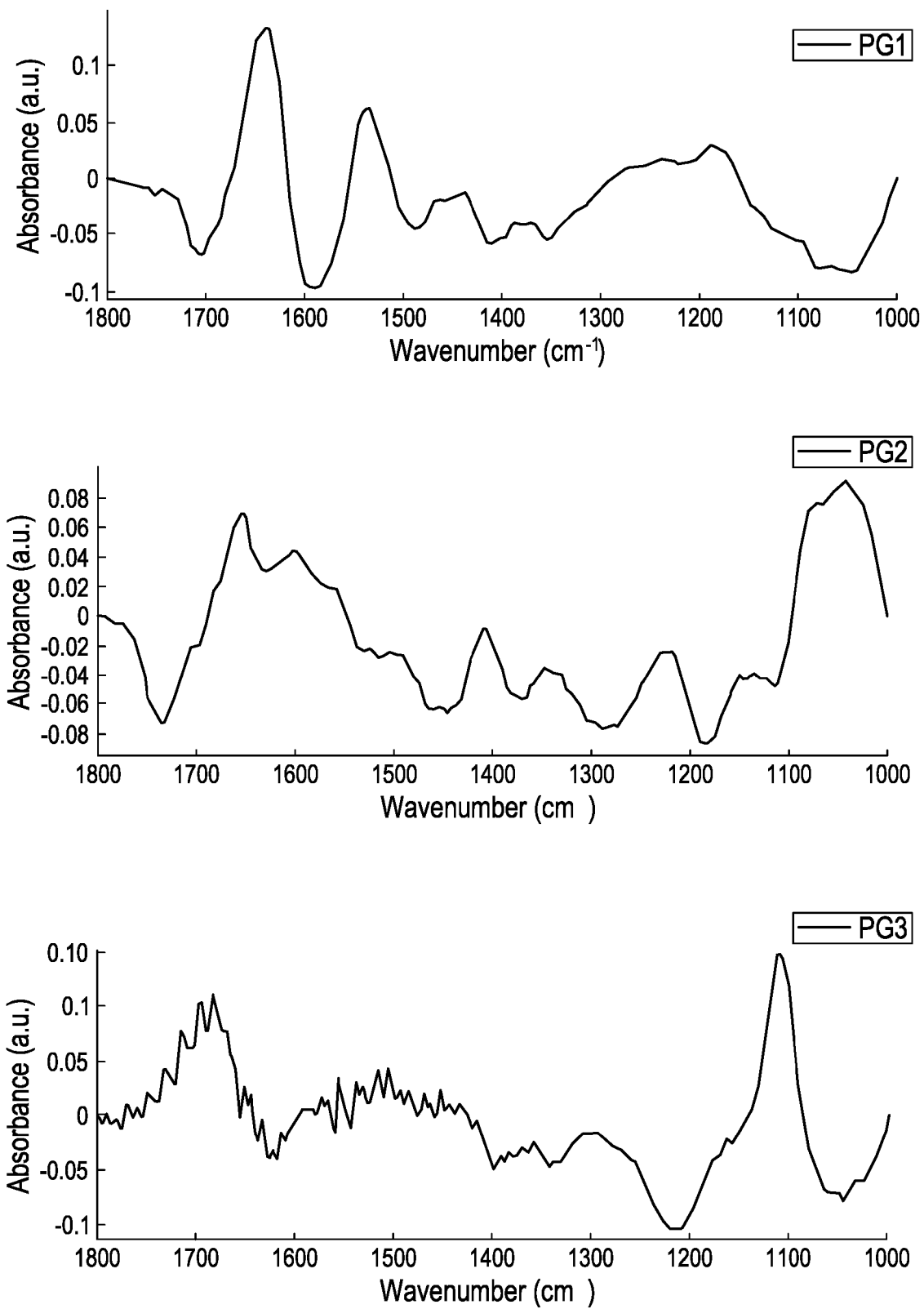

FIG. 49 illustrates the PC loadings spectral discrimination associated with the PCA analysis of FIGS. 47-48. Separation between bacterial families is shown via scatter plots and corresponding loadings show that this is due to distinctive spectral regions.

Thus, it can be see that the methods and systems of the present invention are not limited to the investigation of cancerous samples, but may also be applied to numerous other applications, including for example the investigation and identification of different types of bacteria families of genus. Further, it will be appreciated that the methods and systems of the present invention are not limited to the investigation of biological samples, but may also be applied to measuring or testing non-biological applications, for which spectrometry, e.g. ATR_FTIR spectrometry, may lead to useful results interpretation and/or classification.

It will be appreciated that the described embodiments are not meant to limit the scope of the present invention, and the present invention may be implemented using variations of the described examples.

The invention claimed is:

1. A slide, comprising:
    a) a ample-receiving portion provided on a sample side of a slide;
    b) a beam-receiving portion provided on a beam side of said slide, said beam-receiving portion being arranged opposite said sample-receiving portion, wherein said beam-receiving portion comprises an internal reflection element (IRE); and
    c) a thickness between said beam-receiving portions and said opposite sample-receiving portion selected from the group consisting of 380 μm and 675 μm.

2. The slide according to claim 1, wherein said sample-receiving portion comprises a recessed portion surrounded by a raised portion.

3. The slide according to claim 1, wherein said sample-receiving portion is configured to receive or support a dry sample.

4. The slide according to claim 1, wherein said internal reflection element comprises adjacent grooves that are aligned or parallel and adjacent prisms that are aligned or parallel.

5. The slide according to claim 4, wherein each of said adjacent groove has a width in the range of 50-500 μm.

6. The slide according to claim 1, wherein each of said adjacent groove are spaced apart in the range of 0-200 μm.

7. The slide according to claim 1, wherein said slide further comprises silicon.

8. The slide according to claim 1, further comprising a slide holder, wherein said slide is on, within, or attached to said slide holder.

9. The slide of claim 1, wherein said slide is configured to interface with a FTIR spectrometer.

10. The slide of claim 1, wherein said slide is configured to interface with an ATR-FTIR spectrometer.

11. The slide of claim 1, wherein said internal reflection element comprises an infra-red transmissible material.

12. The slide of claim 11, wherein said infra-red transmissible material is selected from the group consisting of diamond, germanium, zinc selenide and silicon.

13. A method of preparing a sample for IR spectral analysis, the method comprising:
drying one or more samples on a slide at a temperature of approximately 30-36° C. and/or under a gas flow rate of at least 50 m³/h, wherein said slide comprises:
  a) a sample-receiving portion provided on a sample side of said slide;
  b) a beam-receiving portion provided on a beam side of said slide, said beam-receiving portion, wherein said beam-receiving portion comprises an internal reflection element (IRE), and
  c) a thickness between said beam-receiving portion and said opposite sample-receiving portion selected from the group consisting of 380 μm and 675 μm.

14. The method of claim 13, wherein said temperature ranges between 34.5 to 35.5° C.

15. The method of claim 13, wherein said gas flow rate is at least 90 m³/h.

16. The method of claim 13, wherein said internal reflection element comprises an infra-red transmissible material.

17. The method of claim 16, wherein said infra-red transmissible material is selected from the group consisting of diamond, germanium, zinc selenide and silicon.

\* \* \* \* \*